(12) United States Patent
Yamanoue

(10) Patent No.: US 8,836,168 B2
(45) Date of Patent: Sep. 16, 2014

(54) REMAINING CAPACITY EQUALIZING DEVICE AND METHOD, AND REMAINING CAPACITY EQUALIZING DEVICE SET

(75) Inventor: Kouichi Yamanoue, Hiroshima (JP)

(73) Assignee: Visteon Global Technologies, Inc., Van Buren Township, MI (US)

( * ) Notice: Subject to any disclaimer, the term of this patent is extended or adjusted under 35 U.S.C. 154(b) by 692 days.

(21) Appl. No.: 13/183,235

(22) Filed: Jul. 14, 2011

(65) Prior Publication Data

US 2012/0013194 A1  Jan. 19, 2012

(30) Foreign Application Priority Data

Jul. 16, 2010 (JP) ................................. 2010-161801

(51) Int. Cl.
*H02J 7/00* (2006.01)
*H02J 1/00* (2006.01)

(52) U.S. Cl.
CPC ................ *H02J 7/0016* (2013.01); *H02J 1/00* (2013.01); *H02J 7/00* (2013.01)
USPC ................ 307/81; 307/37; 320/116; 320/118

(58) Field of Classification Search
CPC ..................................... H02J 1/00; H02J 7/00
USPC ............................................................ 307/81
See application file for complete search history.

(56) References Cited

U.S. PATENT DOCUMENTS

| | | | |
|---|---|---|---|
| 6,841,971 B1 * | 1/2005 | Spee et al. ..................... | 320/119 |
| 7,245,108 B2 * | 7/2007 | Chertok et al. ................ | 320/132 |
| 7,352,154 B2 * | 4/2008 | Cook ............................. | 320/116 |

* cited by examiner

*Primary Examiner* — Rexford Barnie
*Assistant Examiner* — Toan Vu
(74) *Attorney, Agent, or Firm* — Klintworth & Rozenblat IP LLC

(57) ABSTRACT

A remaining capacity equalizing device is provided having an inductance connected to a reference node of a battery pack and first and second switching elements. A first closed circuit is formed through selecting sequentially a first switching switch from a first switching switch group that is connected to the high-voltage side of the reference node. A second closed circuit is formed by selecting sequentially a second switching switch from among a second switching switch group that is connected to the low-voltage side of the reference node. The first and second switching elements are turned ON/OFF alternatingly for each combination of first and second closed circuits so that, during a specific interval, the ratio of the conductive times of the first and second switching elements is the inverse of the ratio of the numbers of storage cells in the first and second closed circuits.

10 Claims, 13 Drawing Sheets

REMAINING CAPACITY EQUALIZING DEVICE AND METHOD, AND REMAINING CAPACITY EQUALIZING DEVICE SET

CROSS-REFERENCES TO RELATED APPLICATIONS

The Present Application claims the benefit of priority from Japanese Patent Application No. 2010-161801 entitled "REMAINING CAPACITY EQUALIZING DEVICE AND METHOD, AND REMAINING CAPACITY EQUALIZING DEVICE SET" and filed on 16 Jul. 2010, the contents of which are hereby incorporated by reference in their entirety to the extent permitted by law.

FIELD OF THE INVENTION

The present invention relates to a remaining capacity equalizing device and method, and to a remaining capacity equalizing device set, that equalize the remaining capacity (also known as the "State of Charge" or "SOC") of a plurality of storage cells that are connected in series to structure a battery pack, and, more specifically, relates to a remaining capacity equalizing device and method, and a remaining capacity equalizing device set that uses a single inductance and a pair of switching elements that turn ON and OFF alternatingly at high speed.

BACKGROUND OF THE INVENTION

Battery packs wherein 100 or more storage cells are connected in series are used commonly in electric vehicles or hybrid vehicles. However, repetitive charging/discharging cycling of the battery packs will lead to increasing disparities between the remaining capacities of the individual storage cells that structure the battery packs, resulting in non-uniformity of the remaining capacities. The result is a reduction in the effective capacity of the battery pack, which reduces the life expectancy of the battery pack. Because of this, there is the need for a technology to equalize the remaining capacities of storage cells that structure a battery pack.

One example of a technology for equalizing the remaining capacities of storage cells that structure a battery pack is described in Patent Reference 1, below. In this technology described in Patent Reference 1, one end of an inductances connected to a contact point between two storage cells B1 and B2 that are connected in series, and the voltages of the two storage cells are equalized through executing, at appropriate times, an operation for repetitively switching, at short time intervals, between a first mode wherein an electric current flows in a first closed circuit that is formed by connecting the other end of the inductance to the other end of the storage cell B1, and a second mode wherein an electric current flows in a second closed circuit that is formed by connecting the other end of the inductance to the other end of the storage cell B2.

Japanese Unexamined Patent Application Publication 2001-185229 discloses a need for the provision of one inductance for each two storage cells. Because of this there would be the need to provide a total of 50 inductances for a battery pack wherein 100 storage cells are connected in series. The result is that when the number of storage cells increases, the number of inductances increases as well, and thus the device dimensions and device costs increase as well.

Additionally, in the technology disclosed in Japanese Unexamined Patent Application Publication 2001-185229, for each two storage cells it is necessary to provide a pair of switching elements for repetitively alternating between the first and second modes. These switching elements perform switching at a high switching frequency, and thus produce electric radiation noise and transmission noise. Because of this, when the number of batteries is increased, the number of switching elements also increases, increasing the noise as well.

Given this, the object of the present invention is to provide a remaining capacity equalizing device and method, and a remaining capacity equalizing device set, capable of achieving the equalization of the remaining capacities of a plurality of storage cells that are connected in series to structure a battery pack, using a small number of inductances and switching elements.

SUMMARY OF THE INVENTION

The present invention is defined by the following claims, and nothing in this section should be taken as a limitation on those claims.

In order to achieve the object set forth above, a first remaining capacity equalizing device according to the present invention is a remaining capacity equalizing device for equalizing the remaining capacities of a plurality of storage cells that are connected in series to form a battery pack, comprising: an inductance having one end thereof connected to a reference node between mutually adjacent storage cells in the battery pack; first and second switching elements having one end each thereof connected to the other end of the inductance; a first switching switch group able to connect the other end of the first switching element to a high-voltage-side node of each storage cell of the battery pack that is connected on the high-voltage side of the reference node; a second switching switch group able to connect the other end of the second switching element to a low-voltage-side node of each storage cell of the battery pack that is connected on the low-voltage side of the reference node; and a controlling portion for controlling the ON/OFF switching of the first and second switching elements and the first and second switching switch groups; wherein: the controlling portion: selects and puts into a conductive state, one at a time, first switching switches from the first switching switch group, to form a first closed circuit that includes the selected first switching switch, the storage cells between the reference node and the high-voltage-side node to which the first switching switch is connected, the first switching element, and the inductance; selects and puts into a conductive state, one at a time, second switching switches from the second switching switch group, to form a second closed circuit that includes the selected second switching switch, the storage cells between the reference node and the low-voltage-side node to which the second switching switch is connected, the second switching element, and the inductance; alternatingly turns ON/OFF the first and second switching elements so that, for each combination of first and second closed circuits that are determined respectively by the selections of the first and second switching switches, the ratio of the conductive time of the first switching switch and the conductive time of the second switching switch during a specified interval is the inverse of the ratio of the number of storage cells included in the first closed circuit and the number of storage cells included in the second closed circuit; and repeats a cycle wherein the first and second switching switches are switched sequentially.

The first remaining capacity equalizing device according to the present invention, structured in this way, alternatingly turns the first and second switching elements ON/OFF so that the ratio of the conductive time of the first switching element and the conductive time of the second switching element is the inverse of the ratio of the number of storage cells included in the first closed circuit and the number of storage cells included in the second closed circuit. The result is that the total voltage of the storage cells included in the first closed circuit will become equal to the total voltage of the storage cells included in the second closed circuit. Furthermore, by switching the first and second switching switches sequentially one at a time, the combinations of the first and second closed circuits are switched sequentially. Moreover, for each combination of first and second closed circuits, the first and second switching elements alternate ON/OFF identically. The result is that, in the various combinations of first and second closed circuits, the total voltage of the storage cells in the first closed circuit and the total voltage of the storage cells in the second closed circuit at that time will become equal. Furthermore, repetitively cycling the sequential switching of the first and second switching switches causes the voltage (the remaining capacity) of each individual storage cell in the battery pack to ultimately converge to be identical to each other. Consequently, the present invention enables the achievement of equalization of the remaining capacities of the plurality of storage cells that are connected in series to structure a battery pack, through a small number of inductances and switching elements.

Additionally, in the first remaining capacity equalizing device according to the present invention, preferably the controlling portion, for each combination of the first and second closed circuits, shortens, during the initial period of the specified interval, the respective conductive times for the first and second switching elements in one ON/OFF period of the first and second switching elements, while maintaining the ratio of the conductive time of the first switching element and the conductive time of the second switching element during the specific interval, and then lengthens these conductive times gradually as time elapses.

In a case wherein there is large variability in the remaining capacities of the storage cells, turning the first and second switching elements ON and OFF alternatingly would cause an excessively large equalizing electric current to flow in the first and second switching elements. If there were this excessively large equalizing electric current, there would be a danger of damaging the first and second switching elements. On the other hand, as the first and second switching elements are alternatingly turned ON and OFF, the remaining capacities of the storage cells are equalized, causing the electric current that flows in the first and second switching elements to tend to become smaller. Given this, having the respective conductive times for the first and second switching elements for each ON/OFF cycle of the first and second switching elements be a short conductive time at the start of the specific time interval, and elongating as time elapses, makes it possible to prevent the flow of an excessively large equalizing current in the first and second switching elements.

Additionally, preferably, in the present invention, the controlling portion comprises: a driving signal outputting portion for outputting a driving signal for turning ON/OFF the first and second switching elements; a voltage measuring portion for measuring a terminal voltage at the other end of the inductance; a threshold value setting portion for setting a first threshold voltage provided with a specific offset on the high-voltage side, relative to an intermediate voltage, and a second threshold voltage provided with a specific offset on the low-voltage side, relative to the intermediate voltage, with the terminal voltage when both the first and second switching elements are simultaneously in the non-conductive state as the intermediate voltage; and an ON time detecting portion for comparing the measured terminal voltage and the first threshold voltage to calculate a first ON time wherein the first switching element is in a conductive state, and for comparing the measured terminal voltage and the second threshold voltage to calculate a second ON time wherein the second switching element is in a conductive state; wherein: the driving signal outputting portion performs feedback control of the driving signal so that the ratio of the first ON time and the second ON time will be the inverse of the ratio of the number of storage cells included in the first closed circuit and the number of storage cells included in the second closed circuit.

Typically, the actual ON/OFF of the first and second switching elements, relative to the driving signals for controlling the ON/OFF of the first and second switching elements, is known to follow a time delay. For example, in the case of structuring the first and second switching elements from MOSFETs, there is some degree of time delay in the transition of the drain current relative to the gate driving voltage of the MOSFET. On the other hand, in the present invention, the first and second switching elements need to turn ON/OFF alternatingly precisely with the inverse of the number of storage cells. Given this, it is possible to ensure the accuracy of the ratio of the first ON time and the second ON time through feedback control of the driving signal after calculating, based on the first and second threshold voltages, the first ON time wherein the first switching element is in a conductive state and the second ON time wherein the second switching element is in a conductive state.

Additionally, a first remaining capacity equalizing device set according to the present invention is a remaining capacity equalizing device set for equalizing the remaining capacities of a plurality of storage cells that are connected in series to structure a set of battery packs wherein a plurality of battery packs is connected in series, wherein: a remaining capacity equalizing device as set forth in claim 1 is provided for each individual battery pack; and adjacent battery packs share at least one storage cell.

If equalizing the remaining capacities in a plurality of storage cells that structure a battery pack set through a single remaining capacity equalizing device, it would be necessary for the first and second switching elements in the remaining capacity equalizing device to have withstand voltages that are high, for example, half the voltage across the terminals of the battery pack set. Given this, the first remaining capacity equalizing device set according to the present invention divides the battery pack set into a plurality of battery packs, and equalizes the storage cells through a first remaining capacity equalizing device for each battery pack. Moreover, because adjacent battery packs have at least one storage cell in common, the remaining capacities of all of the storage capacities in the battery pack set are equalized. Consequently, the present invention enables the achievement of equalization of the remaining capacities of a plurality of storage cells that are connected in series to structure a battery pack, through a small number of inductances and switching elements, while reducing the withstand voltages required in the first and second switching elements of the individual remaining capacity equalizing devices.

Additionally, a first remaining capacity equalizing method according to the present invention is a remaining capacity equalizing method for equalizing the remaining capacities of a plurality of storage cells that are connected in series to form a battery pack, wherein: a first closed circuit is formed including an inductance having one end thereof connected to a reference node between mutually adjacent storage cells of the battery pack, a first switching element having one end thereof connected to the other end of the inductance, a first switching switch for connecting the other end of the first switching element and one high-voltage-side node selected from the high-voltage-side nodes of the individual storage cells connected on the high-voltage side of the reference node of the battery pack, and the storage cells between the reference node and the selected high-voltage-side node; a second closed circuit is formed including the inductance, a second switching element having one end thereof connected to the other end of the inductance, a second switching switch for connecting the other end of the second switching element and one low-voltage-side node selected from the low-voltage-side nodes of the individual storage cells connected on the low-voltage side of the reference node of the battery pack, and the storage cells between the reference node and the selected low-voltage-side node; the high-voltage-side node to which the first switching switch is connected is switched sequentially and the low-voltage-side node to which the second switching switch is connected is switched sequentially; for each combination of first and second closed circuits that are determined respectively by the high-voltage-side node and the low-voltage-side node to which the first and second switching switches are connected, the first and second switching elements are turned ON/OFF alternatingly so that the ratio of the conductive time of the first switching element and the conductive time of the second switching element in a specific interval is the inverse of the ratio of the number of storage cells included in the first closed circuit and the number of storage cells included in the second closed circuit; and a cycle is repeated wherein the high-voltage-side node to which the first switching switch is connected and the low-voltage-side node to which the second switching switch is connected are switched sequentially.

In the first remaining capacity equalizing method according to the present invention, the first and second switching elements are turned ON/OFF alternatingly so that the ratio of the conductive time of the first switching element and the conductive time of the second switching element is the inverse of the ratio of the number of storage cells included in the first closed circuit and the number of storage cells included in the second closed circuit. The result is that the total voltage of the storage cells included in the first closed circuit will become equal to the total voltage of the storage cells included in the second closed circuit. Furthermore, switching the first and second switching switches sequentially causes the respective combinations of first and second closed circuits to be switched sequentially. Moreover, for each combination of first and second closed circuits, the first and second switching elements are identically turned ON/OFF alternatingly. The result is that in the various combinations of first and second closed circuits, the total voltage of the storage cells in the first closed circuit at that time will become equal to the total voltage of the storage cells in the second closed circuit. Furthermore, repetitively cycling the sequential switching of the first and second switching switches causes the voltage (the remaining capacity) of each individual storage cell in the battery pack to ultimately converge to be identical to each other. Consequently, the present invention enables the achievement of equalization of the remaining capacities of the plurality of storage cells that are connected in series to structure a battery pack, through a small number of inductances and switching elements.

Furthermore, a second remaining capacity equalizing device according to the present invention is a remaining capacity equalizing device for equalizing the remaining capacities of a plurality of storage cells that are connected in series to form a battery pack, comprising: a first switching element having one end thereof connected to the highest-voltage terminal of the battery pack; a second switching element having one end thereof connected to the lowest-voltage terminal of the battery pack; an inductance having one end thereof connected to the other ends of the first and second switching elements; a switching switch group able to connect the other end of the inductance and each node in the plurality of storage cells; and a controlling portion for controlling the ON/OFF switching of the first and second switching elements and of the switching switch group; wherein: the controlling portion: selects and places sequentially into a conductive state, one at a time, a switching switch from the switching switch group to form a first closed circuit including the switching switch, the storage cells that are connected on the high-voltage side of the node to which the switching switch is connected, the first switching element, and the inductance, and to form a second closed circuit including the selected switching switch, the storage cells that are connected on the low-voltage side of the node to which the switching switch is connected, the second switching element, and the inductance; turns the first and second switching elements ON/OFF alternatingly so that, for each combination of first and second closed circuits that are determined by the selection of the selecting node, in the specified interval, the ratio of the conductive time of the first switching element and the conductive time of the second switching element is the inverse of the ratio of the number of storage cells included in the first closed circuit and the number of storage cells included in the second closed circuit; and a cycle is repeated wherein the switching switches selected from the switching switch group are selected sequentially.

In this second remaining capacity equalizing device according to the present invention, structured in this way, the first and second switching elements are turned ON/OFF alternatingly so that the ratio of the conductive time of the first switching element and the conductive time of the second switching element is the inverse of the ratio of the number of storage cells included in the first closed circuit and the number of storage cells included in the second closed circuit. The result is that the total voltage of the storage cells included in the first closed circuit will become equal to the total voltage of the storage cells included in the second closed circuit. Furthermore, switching the switching switches one at a time sequentially causes the combinations of first and second closed circuits to switch sequentially. In addition, for each combination of first and second closed circuits, the first and second switching elements are identically turned ON/OFF alternatingly. The result is that in the various combinations of first and second closed circuits, the total voltage of the storage cells in the first closed circuit at that time becomes equal to the total voltage of the storage cells in the second closed circuit. Furthermore, repetitively cycling the sequential switching of the first and second switching switches causes the voltage (the remaining capacity) of each individual storage cell in the battery pack to ultimately converge to be identical to each other. Consequently, the present invention enables the achievement of equalization of the remaining capacities of the plurality of storage cells that are connected in series to structure a battery pack, through a small number of inductances and switching elements.

Furthermore, preferably, in the second remaining capacity equalizing device according to the present invention, the controlling portion shortens, during the initial period of the specified interval, the respective conductive times for the first and second switching elements in one ON/OFF period of the first and second switching elements, while maintaining the ratio of the conductive time of the first switching element and the conductive time of the second switching element, in each combination of the first and second closed circuits, and then lengthens these conductive times as time elapses.

When there is a large variability in the remaining capacities of the storage cells, alternatingly switching the first and second switching elements ON and OFF may cause there to be an excessively large equalizing current in the first and second switching elements. There is danger of damage to the first and second switching elements when there is this type of excessively large equalizing current. On the other hand, the remaining capacity of the storage cells is equalized as the first and second switching elements are turned ON/OFF alternatingly, tending to cause the currents in the first and second switching elements to become smaller. Given this, the excessively large equalizing currents can be prevented through having the conductive times of the respective first and second switching elements, in each ON/OFF cycle of the first and second switching elements, be short at the beginning of the specific interval, becoming longer as time lapses.

Additionally, in the second remaining capacity equalizing device according to the present invention, preferably the controlling portion comprises: a driving signal outputting portion for outputting a driving signal for turning ON/OFF the first and second switching elements; a voltage measuring portion for measuring a terminal voltage at the other end of the inductance; a threshold value setting portion for setting a first threshold voltage provided with a specific offset on the high-voltage side, relative to an intermediate voltage, and a second threshold voltage provided with a specific offset on the low-voltage side, relative to the intermediate voltage, with the terminal voltage when both the first and second switching elements are simultaneously in the non-conductive state as the intermediate voltage; and an ON time detecting portion for comparing the measured terminal voltage and the first threshold voltage to calculate a first ON time wherein the first switching element is in a conductive state, and for comparing the measured terminal voltage and the second threshold voltage to calculate a second ON time wherein the second switching element is in a conductive state; wherein: the driving signal outputting portion performs feedback control of the driving signal so that the ratio of the first ON time and the second ON time will be the inverse of the ratio of the number of storage cells included in the first closed circuit and the number of storage cells included in the second closed circuit.

Typically, the actual ON/OFF of the first and second switching elements, relative to the driving signals for controlling the ON/OFF of the first and second switching elements, is known to follow a time delay. For example, in the case of structuring the first and second switching elements from MOSFETs, there is some degree of time delay in the transition of the drain current relative to the gate driving voltage of the MOSFET. On the other hand, in the present invention, the first and second switching elements need to turn ON/OFF alternatingly precisely with the inverse of the number of storage cells. Given this, it is possible to ensure the accuracy of the ratio of the first ON time and the second ON time through feedback control of the driving signal after calculating, based on the first and second threshold voltages, the first ON time wherein the first switching element is in a conductive state and the second ON time wherein the second switching element is in a conductive state.

Additionally, a first remaining capacity equalizing device set according to the present invention is a remaining capacity equalizing device set for equalizing the remaining capacities of a plurality of storage cells that are connected in series to structure a set of battery packs wherein a plurality of battery packs is connected in series, wherein: a remaining capacity equalizing device as set forth in claim 1 is provided for each individual battery pack; and adjacent battery packs share at least one storage cell.

If equalizing the remaining capacities in a plurality of storage cells that structure a battery pack set through a single remaining capacity equalizing device, it would be necessary for the first and second switching elements in the remaining capacity equalizing device to have withstand voltages that are high, for example, half the voltage across the terminals of the battery pack set. Given this, the second remaining capacity equalizing device set according to the present invention divides the battery pack set into a plurality of battery packs, and equalizes the storage cells through a first remaining capacity equalizing device for each battery pack. Moreover, because adjacent battery packs have at least one storage cell in common, the remaining capacities of all of the storage capacities in the battery pack set are equalized. Consequently, the present invention enables the achievement of equalization of the remaining capacities of a plurality of storage cells that are connected in series to structure a battery pack, through a small number of inductances and switching elements, while reducing the withstand voltages required in the first and second switching elements of the individual remaining capacity equalizing devices.

A second remaining capacity equalizing method according to the present invention is a remaining capacity equalizing method for equalizing the remaining capacities of a plurality of storage cells that are connected in series to form a battery pack, wherein: a first closed circuit is formed including a first switching element having one end thereof connected to the highest-voltage terminal of the battery pack, an inductance having one end thereof connected to the other end of the first switching element, a switching switch for connecting the other end of the inductance and one selected node selected from the nodes of the battery pack, and the storage cells that are connected on the high-voltage side of the selected node; a second closed circuit is formed including a second switching element having one end thereof connected to the lowest-voltage terminal of the battery pack, an inductance having one end thereof connected to the other end of the second switching element, a switching switch group, and the storage cells that are connected on the low-voltage side of the selected node; the selected nodes that are connected to the switching switches are switched sequentially; for each combination of first and second closed circuits that are determined by the selection of the selected node, the first and second switching elements are turned ON/OFF alternately so that the ratio of the conductive time of the first switching element and the conductive time of the second switching element in a specific interval is the inverse of the ratio of the number of storage cells included in the first closed circuit and the number of storage cells included in the second closed circuit; and a cycle is repeated wherein the selected node to which the switching switch is connected is switched sequentially.

In the second remaining capacity equalizing method according to the present invention, the first and second switching elements are turned ON/OFF alternatingly so that the ratio of the conductive time of the first switching element and the conductive time of the second switching element is the inverse of the ratio of the number of storage cells included in the first closed circuit and the number of storage cells included in the second closed circuit. The result is that the total voltage of the storage cells included in the first closed circuit will become equal to the total voltage of the storage cells included in the second closed circuit. Moreover, the combinations of first and second closed circuits are switched sequentially through the sequential switching, one at a time, of the switching switches. Additionally, for each combination of first and second closed circuits, the first and second switching elements are identically turned ON/OFF alternatingly. The result is that, in the various combinations of first and second closed circuits, the total voltage of the storage cells in the first closed circuit at that time will become equal to the total voltage of the storage cells in the second closed circuit. Furthermore, repetitively cycling the sequential switching of the first and second switching switches causes the voltage (the remaining capacity) of each individual storage cell in the battery pack to ultimately converge to be identical to each other. Consequently, the present invention enables the achievement of equalization of the remaining capacities of the plurality of storage cells that are connected in series to structure a battery pack, through a small number of inductances and switching elements.

In this way, the remaining capacity equalizing device and method, and remaining capacity equalizing device set according to the present invention, enable the achievement of equalization of remaining capacities of a plurality of storage cells that are connected in series to form a battery pack, through the use of a small number of inductances and switching elements.

BRIEF DESCRIPTION OF THE DRAWINGS

The invention can be better understood with reference to the following drawings and description. The components in the figures are not necessarily to scale, emphasis instead being placed upon illustrating the principles of the invention.

The invention will now be further described, by way of example only, and with reference to the accompanying drawings, in which.

Forms of embodiment according to the present invention will be explained below in reference to the appended figures.

DETAILED DESCRIPTION

Figure 1:
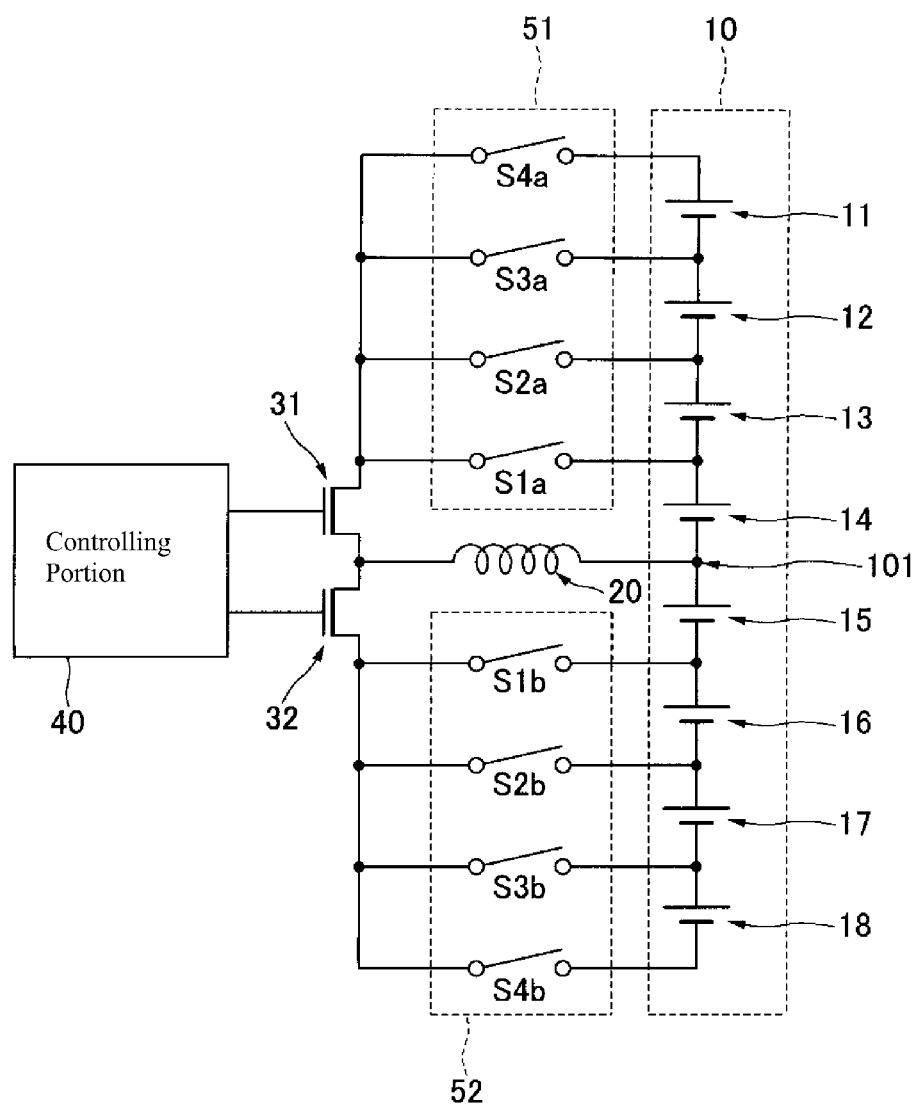
FIG. 1 is a circuit diagram of a remaining capacity equalizing device according to a first form of embodiment according to the present invention.

First, a form of embodiment of a first remaining capacity equalizing device and a first remaining capacity equalizing element according to the present invention will be explained in reference to FIG. 1 through FIG. 4. FIG. 1 is a circuit diagram of a remaining capacity equalizing device according to the first form of embodiment.

The remaining capacity equalizing device according to the first form of embodiment is for equalizing the remaining capacity (SOC) of eight storage cells 11 through 18 that are connected in series to structure a battery pack 10.

Note that while FIG. 1 illustrates an example of a battery pack 10 wherein eight storage cells 11 to 18 are connected in series, the number of storage cells is not limited thereto. The number of storage cells is preferably no less than three, and more preferably no less than four.

One end of an inductance 20 is connected to a reference node 101 between two storage cells 14 and 15 that are adjacent to each other in the battery pack 10. The reference node 101 can be set arbitrarily between neighboring storage cells, but preferably, it should be set in a position that divides the series of the storage cells 11 through 18, which are connected in series, in half so that the number of storage cells 11 through 14 on the high-voltage side of the reference node 101 will be identical to the number of storage cells 15 to 18 on the low-voltage side.

Note that if there is an odd number of storage cells connected in series, then the reference node should be at either the high-voltage side or the low-voltage side of the storage cell that is in the very center of the storage cells that are connected in series.

On the other hand, the other end of the inductance is connected to one end of the first and second switching elements 31 and 32. The first switching element 31 is structured from a Pch (P-channel) MOSFET, and the second switching element 32 is structured from an Nch (N-channel) MOSFET.

Note that the first and second switching elements may be of mutually identical channel types (P-channel or N-channel) MOSFET, or may be bipolar transistors.

Additionally, the other end of the first switching element 31 can be connected to a high-voltage-side node of any of the storage cells 11 to 14 that are connected on the high-voltage side of the reference node 101 in the battery pack 10, through a first switching switch group 51. The first switching switch group 51 is structured from four switching switches S1a through S4a, which can be connected respectively to the high-voltage-side nodes of the individual storage cells 11 through 14.

Additionally, the other end of the second switching element 32 can be connected to any of the low-voltage-side nodes of the storage cells 15 through 11 that are connected on the low-voltage side of the reference node 101 in the battery pack 10, through a second switching switch group 52. The second switching switch group 52 is structured from four switching switches S1b through S4b, which can be connected respectively to the low-voltage side nodes of the storage cells 15 to 18.

Note that the individual switching switches may be semiconductor switches such as MOSFETs, or may be relay switches.

Furthermore, the ON/OFF switching of the first and second switching elements 31 and 32, and the ON/OFF switching of the individual switching switches S1a through S4a and S1b through S4b of the first and second switching switch groups 51 and 52 are controlled by the controlling portion 40.

Note that in FIG. 1, the control signals for controlling the respective ON/OFF switching of the individual switching switches S1a through S4a that structure the first switching switch group 51 and of the individual switching switches S1b through S4b that structure the second switching switch group 52, and the wiring that extends from the controlling portion 40 to the individual switching switches S1a through S4a and S1b through S4b are omitted.

The controlling portion 40 sequentially selects and places in a conductive state (ON), one at a time, a first switching switch from among the switching switches S1a through S4a that structure the first switching switch group 51. The result of the selected first switching switch being in a conductive state is the formation of a first closed circuit that includes that first switching switch, the storage cells between the high-voltage-side node to which the first switching switch is connected and the reference node 101, the first switching element 31, and the inductance 20.

The controlling portion 40 also sequentially selects and places into a conductive state (ON), one at a time, a second switching switch from among the switching switches S1b through S4b that structure the second switching switch group. The result of the selected second switching switch being placed into a conductive state is the formation of a second closed circuit that includes the second switching switch, the storage cells between the low-voltage-side node to which the second switching switch is connected and the reference node 101, the second switching element 32, and the inductance 20.

The controlling portion sequentially selects the first and second switching switches, one each at a time, as described in the example of operation below, so that the combination of the first and second closed circuits will be switched with every specified interval T=100 ms.

Note that the specified intervals, in principle, may be of mutually identical lengths for each combination of first and second closed circuits, or may be of mutually differing lengths. For example, if there is a large discrepancy between the remaining capacity of the storage cells included in the first closed circuit and the remaining capacity of the storage cells included in the second closed circuit, then the conductive time for that combination may be longer than the conductive times for other combinations.

The controlling portion 40 also turns ON/OFF the first and second switching elements 31 and 32 alternatingly. In the present form of embodiment, the first switching element 31 and the second switching element 32 turn ON and OFF with a period of $\tau=5$ μs, that is, a frequency f=200 kHz.

Here the controlling portion 40, as explained in detail below, turns the first and second switching elements 31 and 32 ON/OFF alternatingly so that the ratio of the conductive time of the first switching element 31 and the conductive time of the second switching element 32 is the inverse of the ratio of the number of storage cells included in the first closed circuit and the number of storage cells included in the second closed circuit.

Additionally, the controlling portion 40 repeats the cycle of sequentially selecting, one each at a time, the first and second switching switches.

Note that in a case wherein the battery pack is mounted in an automobile, this cycle preferably is repeated while the automobile power switch is turned ON, or repeated while the battery pack is connected to a charging device that is external to the automobile.

Furthermore, if the power switch is turned ON or if connected to a charging device, the repetition of the aforementioned cycle may be limited to only when the difference between the maximum voltage and the minimum voltage among the storage cells exceeds a specific value when the voltages of the individual storage cells are measured. Repeating the cycle only when the difference is great, in this way, makes it possible to achieve a reduction of the power that is consumed by the equalizing device itself.

An example of the operation of the equalizing device of the first form of embodiment, that is, an example of the first remaining capacity equalizing method, will be explained next in reference to the timing charts in FIG. 2 through FIG. 4.

Figure 2:
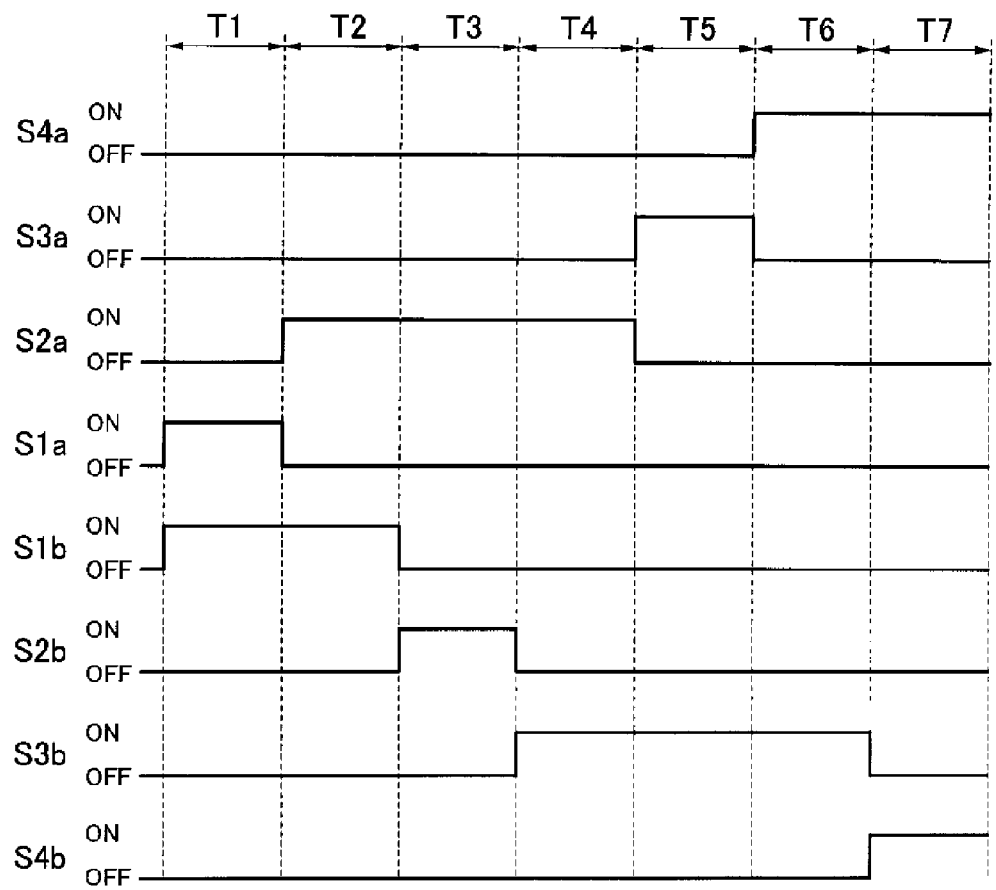
FIG. 2 is a timing chart for the ON/OFF switching of the switching switches in the remaining capacity equalizing device according to the first form of embodiment according to the present invention.

First, as illustrated in FIG. 2, during the interval T1, the first switching switch S1a, selected from the first switching switch group 51, and the second switching switch S1b, selected from the second switching switch group 52, are both in a conductive state (ON). The result is the formation, in FIG. 1, of a first closed circuit that includes the inductance 20, the first switching element 31, the first switching switch S1a, and the storage cell 14, and also the formation of a second closed circuit that includes the inductance 20, the second switching element 32, the second switching switch S1b, and the storage cell 15.

Figure 3:
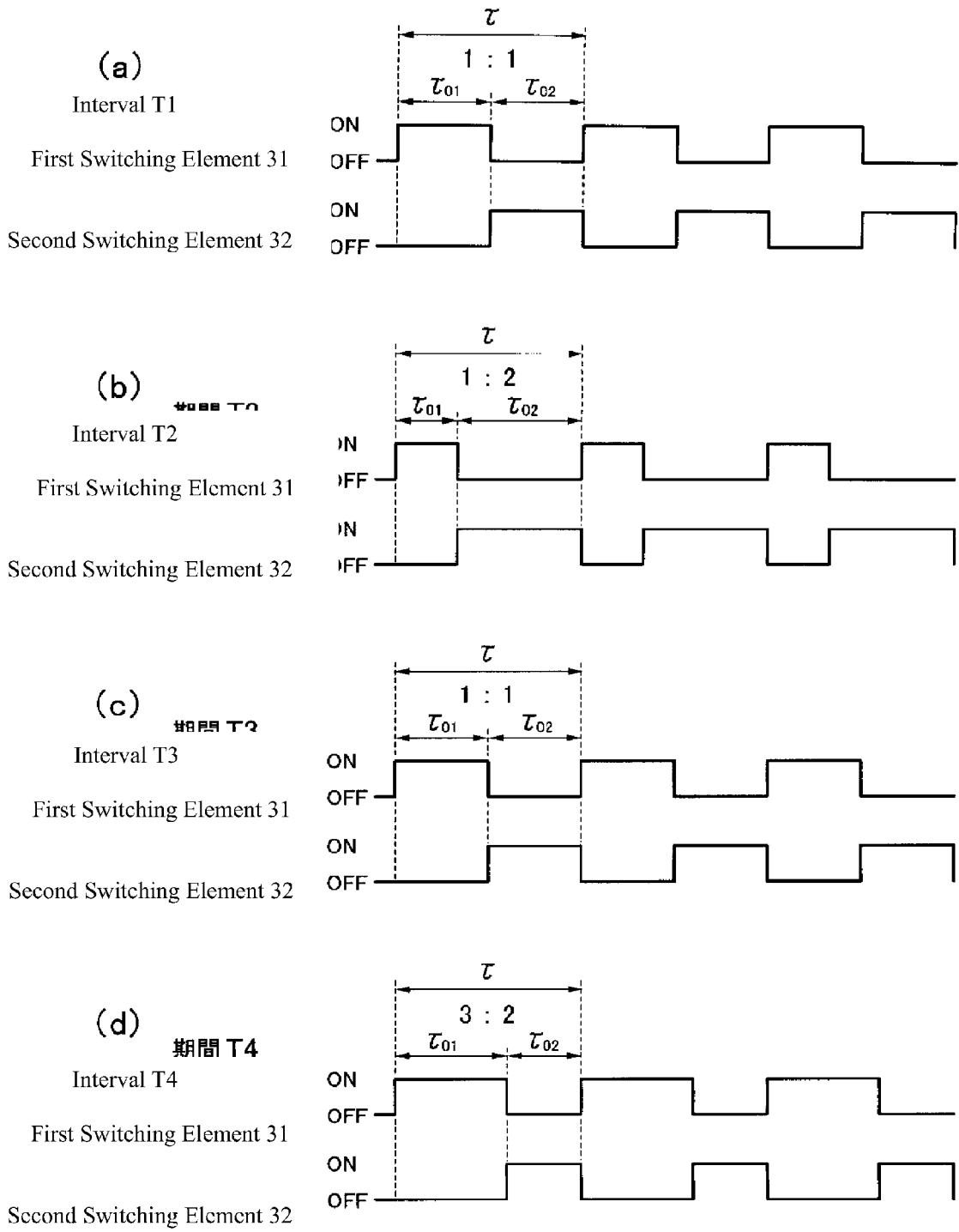
FIG. 3 is a timing chart of the ON/OFF switching of the first and second switching elements in the remaining capacity equalizing device according to the first form of embodiment according to the present invention.

Here the timing chart for the ON/OFF switching of the first switching element 31 and the second switching element 32 during the interval T1 is illustrated schematically in FIG. 3 (a).

The number of storage cells included in the first closed circuit during the interval T1 is 1, and the number of storage cells included in the second closed circuit is also 1. Because of this, during the interval T1, the first and second switching elements are turned ON/OFF alternatingly so that the ratio of the conductive time of the first switching element 31 and the conductive time of the second switching element 32 is the inverse of the ratio 1:1 of the number of storage cells included in the first closed circuit, which is 1, and the number of storage cells included in the second closed circuit, which is also 1. Consequently, the ratio of the conductive time of the first switching element 31 and the conductive time of the second switching element 32 is 1:1.

That is, during the interval T1, the first switching element 31 is in a conductive state only during the ON time of $\tau 01$ with a duty ratio of 50% of the period $\tau$, and the second switching element 32 is in a conductive state only during the ON time $\tau 02$ of a duty cycle of the remaining 50% of the period $\tau$.

Note that in order to prevent the first and second switching elements 31 and 32 from being in the conductive state simultaneously, a dead time is provided between the ON time $\tau 01$ and the ON time $\tau 02$. This dead time is, for example, 500 ns.

By alternatingly opening and closing, with a ratio of 1:1, the first and second switching elements 31 and 32 during the interval T1 in this way, the voltage V14 of the storage cell 14 in the first closed circuit will become equal to the voltage V15 of the storage cell 15 in the second closed circuit. This results in V14=V15.

Following this, as illustrated in FIG. 2, during the interval T2, the first switching switch S2a, newly selected from the first switching switch group 51, and the second switching switch S1b, selected from the second switching switch group 52, both enter the conductive state (ON). The result, in FIG. 1, is the formation of a first closed circuit that includes the inductance 20, the first switching element 31, the first switching switch S2a, and two storage cells 13 and 14, as well as the formation of a second closed circuit that includes the inductance 20, the second switching element 32, the second switching switch S1b, and one storage cell 15.

Here a timing chart for the ON/OFF switching of the first switching element 31 and the second switching element 32 during the interval T2 is illustrated schematically in FIG. 3 (b).

The number of storage cells included in the first closed circuit in the interval T2 is 2, and the number of storage cells included in the second closed circuit is 1. Because of this, during the interval T2, the first and second switching elements are turned ON/OFF alternately so that the ratio of the conductive time of the first switching element 31 and the conductive time of the second switching element 32 will be the inverse of the ratio 2:1 of the number of storage cells included in the first closed circuit, which is 2, and the number of storage cells included in the second closed circuit, which is 1. Consequently, the ratio of the conductive time of the first switching element 31 and the conductive time of the second switching element 32 is 1:2.

That is, during the interval T2, the first switching element 31 is in a conductive state only during the ON time τ01 that has a duty ratio of about 33.3% during the period τ, and the second switching element 32 is in a conductive state only during the ON time τ02 that has a duty ratio of the remaining approximately 66.7% of the period τ.

Opening and closing the first and second switching elements 31 and 32 alternatingly with a ratio of 1:2 during the interval T2 causes the total voltage (V13+V14) of the two storage cells 13 and 14 in the first closed circuit to become equal to twice the voltage of the one storage cell 15 in the second closed circuit. This results in (V13+V14)=V15×2.

Following this, as illustrated in FIG. 2, during the interval T3, the first switching switch S2a, selected from the first switching switch group 51, and the second switching switch S2b, newly selected from the second switching switch group 52, both assume the conductive state (ON). The result, in FIG. 1, is the formation of a first closed circuit that includes the inductance 20, the first switching element 31, the first switching switch S2a, and the two storage cells 13 and 14, along with the formation of the second closed circuit that includes the inductance 20, the second switching element 32, the second switching switch S2b, and the two storage cells 15 and 16.

Here a timing chart for the ON/OFF switching of the first switching element 31 and the second switching element 32 during the interval T3 is illustrated schematically in FIG. 3 (c).

The number of storage cells included in the first closed circuit in the interval T3 is 2, and the number of storage cells included in the second closed circuit is 2. Because of this, during the interval T3, the first and second switching elements are turned ON/OFF alternately so that the ratio of the conductive time of the first switching element 31 and the conductive time of the second switching element 32 will be the inverse of the ratio 2:2 of the number of storage cells included in the first closed circuit, which is 2, and the number of storage cells included in the second closed circuit, which is 2. Consequently, the ratio of the conductive time of the first switching element 31 and the conductive time of the second switching element 32 is 1:1.

That is, during the interval T3, the first switching element 31 is in a conductive state only during the ON time τ01 that has a duty ratio of 50% during the period τ, and the second switching element 32 is in a conductive state only during the ON time τ02 that has a duty ratio of the remaining 50% of the period τ.

Opening and closing the first and second switching elements 31 and 32 alternatingly with a ratio of 2:2 during the interval T3 causes the total voltage (V13+V14) of the two storage cells 13 and 14 in the first closed circuit to become equal to the voltage of the two storage cells 15 and 16 in the second closed circuit. This results in (V13+V14)=(V15+V16).

Following this, as illustrated in FIG. 2, during the interval T4, the first switching switch S2a, selected from the first switching switch group 51, and the second switching switch S3b, newly selected from the second switching switch group 52, both assume the conductive state (ON). The result, in FIG. 1, is the formation of a first closed circuit that includes the inductance 20, the first switching element 31, the first switching switch S2a, and the two storage cells 13 and 14, along with the formation of the second closed circuit that includes the inductance 20, the second switching element 32, the second switching switch S3b, and the three storage cells 15 through 17.

Here a timing chart for the ON/OFF switching of the first switching element 31 and the second switching element 32 during the interval T4 is illustrated schematically in FIG. 3 (d).

The number of storage cells included in the first closed circuit in the interval T4 is 2, and the number of storage cells included in the second closed circuit is 3. Because of this, during the interval T4, the first and second switching elements are turned ON/OFF alternately so that the ratio of the conductive time of the first switching element 31 and the conductive time of the second switching element 32 will be the inverse of the ratio 2:3 of the number of storage cells included in the first closed circuit, which is 2, and the number of storage cells included in the second closed circuit, which is 3. Consequently, the ratio of the conductive time of the first switching element 31 and the conductive time of the second switching element 32 is 3:2.

That is, during the interval T4, the first switching element 31 is in a conductive state only during the ON time τ01 that has a duty ratio of about 60% during the period τ, and the second switching element 32 is in a conductive state only during the ON time τ02 that has a duty ratio of the remaining approximately 40% of the period τ.

Opening and closing the first and second switching elements 31 and 32 alternatingly with a ratio of 3:2 during the interval T4 causes the total voltage (V13+V14) of the two storage cells 13 and 14 in the first closed circuit to become equal to 2/3 the voltage of the three storage cells 15 through 17 in the second closed circuit. This results in (V13+V14)=(V15+V16+V17)×(2/3).

Following this, as illustrated in FIG. 2, during the interval T5, the first switching switch S3a, newly selected from the first switching switch group 51, and the second switching switch S3b, selected from the second switching switch group 52, both assume the conductive state (ON). The result, in FIG. 1, is the formation of a first closed circuit that includes the inductance 20, the first switching element 31, the first switching switch S3a, and the three storage cells 12 through 14, along with the formation of the second closed circuit that includes the inductance 20, the second switching element 32, the second switching switch S3b, and the three storage cells 15 through 17.

Figure 4:
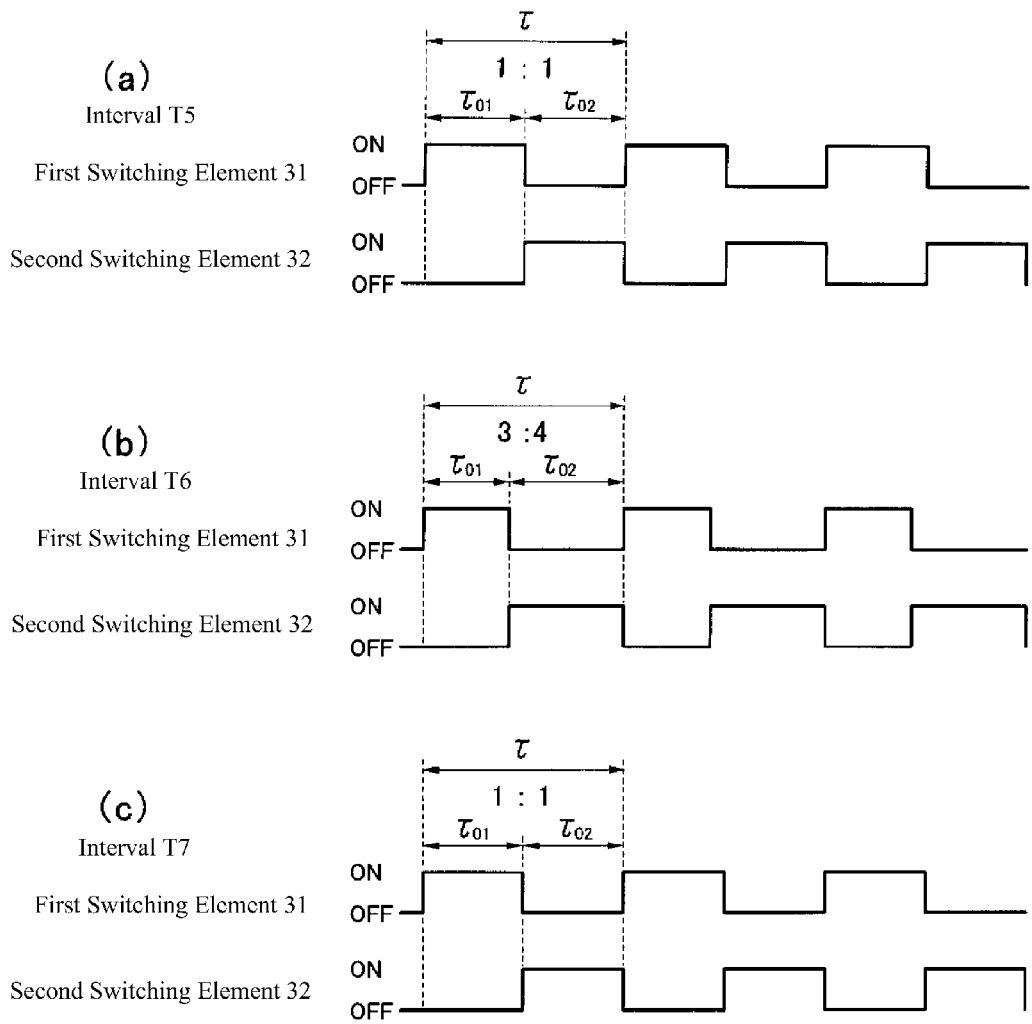
FIG. 4 is a timing chart of the ON/OFF switching of the first and second switching elements in the remaining capacity equalizing device according to the first form of embodiment according to the present invention.

Here a timing chart for the ON/OFF switching of the first switching element 31 and the second switching element 32 during the interval T5 is illustrated schematically in FIG. 4 (a).

The number of storage cells included in the first closed circuit in the interval T5 is 3, and the number of storage cells included in the second closed circuit is 3. Because of this, during the interval T5, the first and second switching elements are turned ON/OFF alternatingly so that the ratio of the conductive time of the first switching element 31 and the conductive time of the second switching element 32 will be the inverse of the ratio 3:3 of the number of storage cells included in the first closed circuit, which is 3, and the number of storage cells included in the second closed circuit, which is 3. Consequently, the ratio of the conductive time of the first switching element 31 and the conductive time of the second switching element 32 is 1:1.

That is, during the interval T5, the first switching element 31 is in a conductive state only during the ON time $\tau 01$ that has a duty ratio of 50% during the period $\tau$, and the second switching element 32 is in a conductive state only during the ON time $\tau 02$ that has a duty ratio of the remaining 50% of the period $\tau$.

Opening and closing the first and second switching elements 31 and 32 alternatingly with a ratio of 1:1 during the interval T5 causes the total voltage (V12+V13+V14) of the three storage cells 12 through 14 in the first closed circuit to become equal to the voltage of the three storage cells 15 through 17 in the second closed circuit. This results in (V12+V13+V14)=(V15+V16+V17).

Following this, as illustrated in FIG. 2, during the interval T6, the first switching switch S4a, newly selected from the first switching switch group 51, and the second switching switch S3b, selected from the second switching switch group 52, both assume the conductive state (ON). The result, in FIG. 1, is the formation of a first closed circuit that includes the inductance 20, the first switching element 31, the first switching switch S4a, and the four storage cells 11 through 14, along with the formation of the second closed circuit that includes the inductance 20, the second switching element 32, the second switching switch S3b, and the three storage cells 15 through 17.

Here a timing chart for the ON/OFF switching of the first switching element 31 and the second switching element 32 during the interval T6 is illustrated schematically in FIG. 4 (b).

The number of storage cells included in the first closed circuit in the interval T6 is 4, and the number of storage cells included in the second closed circuit is 3. Because of this, during the interval T6, the first and second switching elements are turned ON/OFF alternatingly so that the ratio of the conductive time of the first switching element 31 and the conductive time of the second switching element 32 will be the inverse of the ratio 4:3 of the number of storage cells included in the first closed circuit, which is 4, and the number of storage cells included in the second closed circuit, which is 3. Consequently, the ratio of the conductive time of the first switching element 31 and the conductive time of the second switching element 32 is 3:4.

That is, during the interval T6, the first switching element 31 is in a conductive state only during the ON time $\tau 01$ that has a duty ratio of about 43% during the period $\tau$, and the second switching element 32 is in a conductive state only during the ON time $\tau 02$ that has a duty ratio of the remaining approximately 57% of the period $\tau$.

Opening and closing the first and second switching elements 31 and 32 alternatingly with a ratio of 3:4 during the interval T6 causes the total voltage (V11+V12+V13+V14) of the four storage cells 11 through 14 in the first closed circuit to become equal to 4/3 the voltage of the three storage cells 15 through 17 in the second closed circuit. This results in (V11+V12+V13+V14)=(V15+V16+V17)×(4/3).

Following this, as illustrated in FIG. 2, during the interval T7, the first switching switch S4a, selected from the first switching switch group 51, and the second switching switch S4b, newly selected from the second switching switch group 52, both assume the conductive state (ON). The result, in FIG. 1, is the formation of a first closed circuit that includes the inductance 20, the first switching element 31, the first switching switch S4a, and the four storage cells 11 through 14, along with the formation of the second closed circuit that includes the inductance 20, the second switching element 32, the second switching switch S4b, and the four storage cells 15 through 18.

Here a timing chart for the ON/OFF switching of the first switching element 31 and the second switching element 32 during the interval T7 is illustrated schematically in FIG. 4 (c).

The number of storage cells included in the first closed circuit in the interval T7 is 4, and the number of storage cells included in the second closed circuit is 4. Because of this, during the interval T7, the first and second switching elements are turned ON/OFF alternatingly so that the ratio of the conductive time of the first switching element 31 and the conductive time of the second switching element 32 will be the inverse of the ratio 4:4 of the number of storage cells included in the first closed circuit, which is 4, and the number of storage cells included in the second closed circuit, which is 4. Consequently, the ratio of the conductive time of the first switching element 31 and the conductive time of the second switching element 32 is 4:4.

That is, during the interval T7, the first switching element 31 is in a conductive state only during the ON time $\tau 01$ that has a duty ratio of 50% during the period $\tau$, and the second switching element 32 is in a conductive state only during the ON time $\tau 02$ that has a duty ratio of the remaining 50% of the period $\tau$.

Opening and closing the first and second switching elements 31 and 32 alternatingly with a ratio of 1:1 during the interval T7 causes the total voltage (V11+V12+V13+V14) of the four storage cells 11 through 14 in the first closed circuit to become equal to the voltage of the four storage cells 15 through 18 in the second closed circuit. This results in (V11+V12+V13+V14)=(V15+V16+V17+V18).

Given this, through the repetition of the cycle for the intervals T1 through T7, above, the remaining capacities of the individual storage cells 11 to 18, that is, the voltages V11 through V18 converge so as to be identical. That is, in essence, the result is V11=V12=V13=V14=V15=V16=V17=V18. Doing so makes it possible to achieve equalization of the remaining capacities of the individual storage cells 11 to 18.

As described above, the remaining capacity equalizing device and method according to the present invention enables the achievement of equalization of the remaining capacities of a plurality of storage cells that are connected in series to structure a battery pack, through the use of a single inductance and a pair of switching elements. Given this, even if the number of storage cells is increased, there is no need to increase the number of inductances or switching elements. Because of this, even if there is an increase in the number of storage cells, it is possible to avoid increases in equipment dimensions and cost, and possible to avoid increases in the noise due to the switching elements.

Note that in the present form of embodiment the number of switching switches increases commensurate with the increase in the number of storage cells. However, the frequency of the switching of the switching switches (for example, f=10 Hz, (specified interval T=100 ms)) is extremely low when compared to the switching frequency of the first and second switching elements (for example, f=200 kHz (period τ=5 μs)), and thus the noise due to the switching switches is not a large problem.

Furthermore, while in the present form of embodiment an example wherein the remaining capacities of eight storage cells were equalized, the number of storage cells is not limited thereto, but rather it is also possible to equalize, for example, the remaining capacities of 100 or more storage cells that are connected in series.

Additionally, while in the present form of embodiment an example was explained wherein a conductive state was produced sequentially starting with the first and second switching switches nearest to the reference node 101, in the present invention the sequence for selecting the first and second switching switches is not limited thereto, but rather the selections of the first and second switches may be, for example, sequentially starting with those that are furthest from the reference node 101.

Furthermore, the combinations of first and second closed circuits that are determined, respectively, by the selections of the first and second switching switches may select all combinations, or may repeat cycles that select only some of the combinations.

A second form of embodiment of the first remaining capacity equalizing device according to the present invention will be explained next.

The structure of the remaining capacity equalizing device according to the second form of embodiment is identical to that in the first form of embodiment, and thus detailed explanations thereof will be omitted. Moreover, the operation of the remaining capacity equalizing device according to the second form of embodiment is also fundamentally the same as in the first form of embodiment. However, in the second form of embodiment, the controlling portion 40, while maintaining, during the specified interval, the ratio of the conductive time τ01 of the first switching element 31 and the conductive time τ02 of the second switching element 32, shortens both the conductive times τ01 and τ02 of the first and second switching elements in one ON/OFF period for the first and second switching elements 31 and 32, and then gradually lengthen them with the passage of time.

Figure 5:
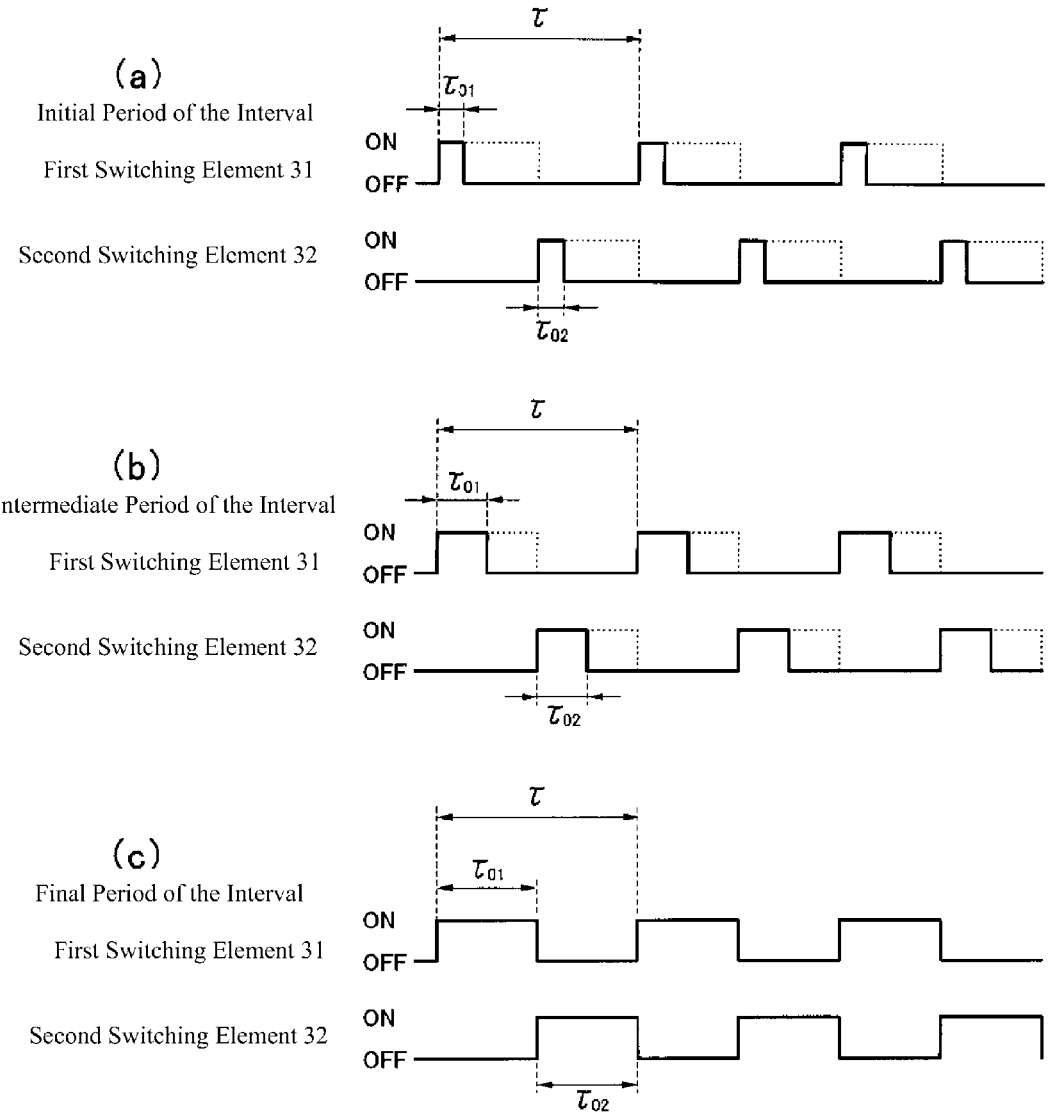
FIG. 5 is a timing chart of the ON/OFF switching of the first and second switching elements in the remaining capacity equalizing device according to a second form of embodiment according to the present invention.

FIG. 5 illustrates a ON/OFF timing chart for the first and second switching elements in the remaining capacity equalizing device according to the second form of embodiment. FIG. 5 (a) illustrates a timing chart for the initial period of the specified interval T, FIG. 5 (b) illustrates a timing chart for an intermediate period of the specified interval T, and FIG. 5 (c) illustrates a timing chart for a final period of the specified interval T.

Throughout the specified interval T, the alternating ON/OFF period of the first and second switching elements 31 and 32 is maintained so as to be constant. Additionally, the lengths of the conductive times τ01 and τ02 are short at the initial period of the specified interval T illustrated in FIG. 5 (a), are longer during the intermediate period illustrated in FIG. 5 (b) than during the initial period, and are even longer during the final period illustrated in FIG. 5 (c) than the intermediate period.

Note that in the example in FIG. 5, the ratio of the length of the conductive time τ01 and the length of the conductive time τ02 is maintained at 1:1 throughout the specified interval T. Additionally, for the case wherein the ratio is 1:2, as illustrated in, for example, FIG. 3 (b), the lengths of the conductive times τ01 and τ02 may be lengthened gradually while maintaining that ratio.

Shortening the conductive times in the initial period of the specified interval while maintaining, as a constant, the alternating ON/OFF period for the first and second switching elements in this way makes it possible to prevent an excessively large equalizing current in the first and second switching elements.

Note that the lengths of the conductive times τ01 and τ02 may be increased in a stepwise manner, or may be increased continuously. Additionally, the length of the conductive times τ01 and τ02, as will be explained next, may be determined based on the voltages of the individual storage cells.

First, as will be explained below, the voltages of the individual storage cells are measured, and a control target voltage is set as in Equation (1), below:

$$(\text{control target voltage}) = (\text{total voltage of the storage cells included in the closed circuit}) \times (\text{duty ratio}) \tag{1}$$

Here the "duty ratio" is the proportion of time wherein the first switching element is in a conductive state so as to cause the first closed circuit to be conductive, or the proportion of time wherein the second switching element 32 is in a conductive state so as to cause the second closed circuit to be conductive.

Additionally, the voltage between the first and second switching elements is measured as the "measured voltage." The "coil current" is next calculated through Equation (2), below:

$$(\text{coil current}) = ((\text{control target voltage}) - (\text{measured voltage}))/(\text{DC resistance of the inductance}) \tag{2}$$

Following this, the conductive time τ01 of the first switching element 31 and the conductive time τ02 of the second switching element 32 are controlled so that the control target current, given by Equation (3), below, will be less than a specified threshold value:

$$(\text{control target current}) = (\text{coil current}) \times (\tau 01 + \tau 02)/\tau \tag{3}$$

The specified threshold value may be set in accordance with the abilities of the first and second switching elements to withstand electric currents.

Additionally, in the specified interval T, the difference between the control target voltage and the measured voltage will become smaller due to the repetition of the alternating opening and closing of the first and second switching elements 31 and 32. Because of this, the total conductive time of the first and second switching elements (τ01+τ02) can be increased while maintaining the coil current at less than the threshold value.

Figure 6:
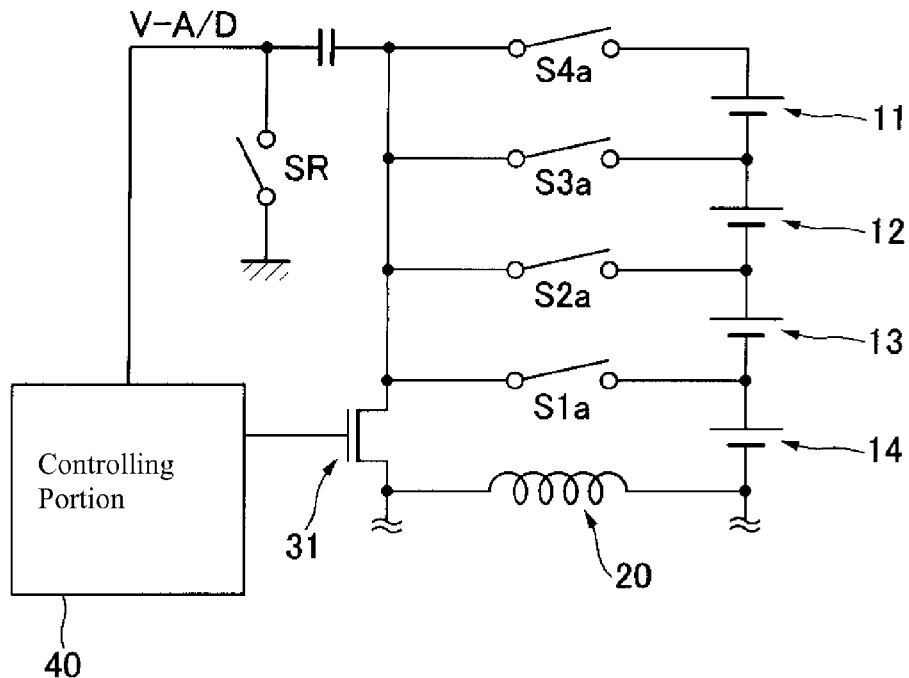
FIG. 6 is a circuit diagram for the voltage measurement of the individual storage cells in the second form of embodiment according to the present invention.

The method for measuring the voltages of the individual storage cells that structure the battery pack will be explained below in reference to FIG. 6 and FIG. 7. FIG. 6 is a diagram of a circuit for measuring the voltages of the individual storage cells that structure the battery pack, and FIG. 7 is a timing chart for measuring the voltages of the individual storage cells that structure the battery pack.

Figure 7:
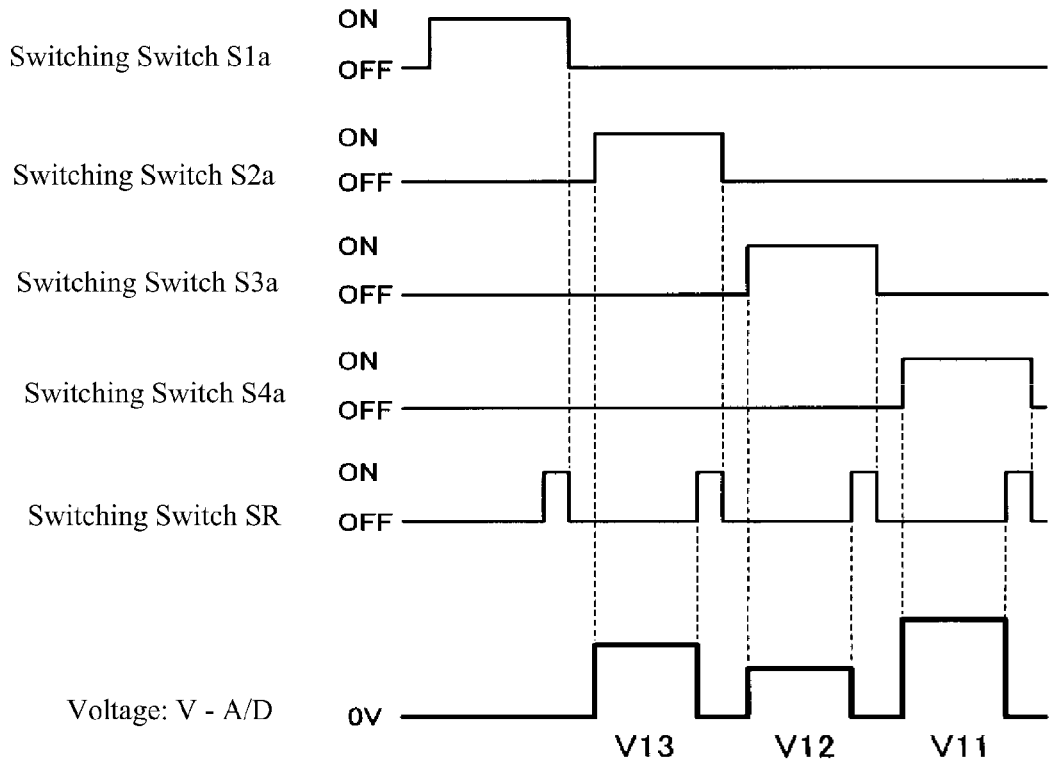
FIG. 7 is a timing chart for the voltage measurements of the individual storage cells in the second form of embodiment according to the present invention.

In the timing chart illustrated in FIG. 7, the switching switches S1a through S4a are placed in a conductive state sequentially for 1 ms each when measuring the voltages of the storage cells. At this time, at the end of the interval of the conductive state of the individual switching switches, a reset switch SR is turned ON for an interval of about 100 μs each. Specifically, when measuring the voltage of the storage cell V13, the switching switch S1a on the low-voltage side thereof is turned ON, following which, after the switching switch S1a is turned OFF, the switching switch S2a at the low battery, or low voltage, side of the next storage cell V12 is turned ON. Then A/D conversion is performed on V–A/D, and the voltage of the storage cell V13 is stored.

Note that preferably the first switching element 31 is OFF during the voltage measurement. This is because it is difficult to measure the voltage accurately due to the voltage drop in the switching switches when the voltage measurement is performed on the storage cells while the first and second switching elements 31 and 32 are opening and closing alternatingly.

Figure 8:
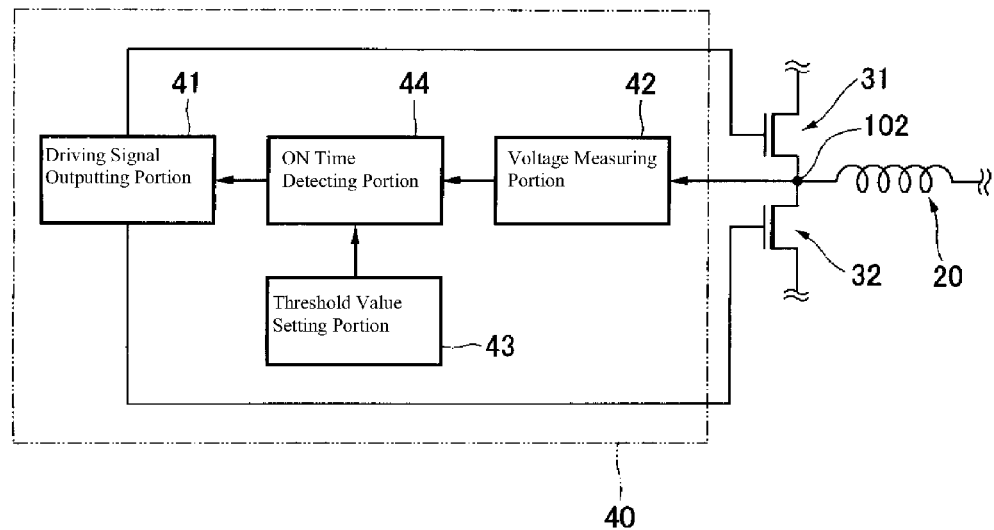
FIG. 8 is a block circuit diagram of the controlling portion in a remaining capacity equalizing device according to a third form of embodiment according to the present invention.

A third form of embodiment of the first remaining capacity equalizing device according to the present invention will be explained next in reference to FIG. 8 and FIG. 9.

The structure of the remaining capacity equalizing device according to the third form of embodiment is also fundamentally identical to that of the first form of embodiment. However, as illustrated in FIG. 8, the controlling portion 40 in the third form of embodiment has not only a driving signal outputting portion for outputting a driving signal for controlling the ON/OFF switching of the first and second switching elements 31 and 32, but also has a voltage measuring portion 42, a threshold value setting portion 43, and an ON time detecting portion 44.

The voltage measuring portion 42 measures the terminal voltage of the other end 102 of the inductance 20, that is, measures the terminal voltage at the node 102 between the first switching element 31 and the second switching element 32. Additionally, the threshold setting portion 43 sets a first threshold voltage Vth1 which is given a specific offset on the high-voltage side relative to an intermediate voltage V0, and a second threshold voltage Vth2, which is given a specific offset on the low-voltage side relative to the intermediate voltage V0, with the terminal voltage when the first and second switching elements 31 and 32 are simultaneously in the non-conductive state as the intermediate voltage V0. Furthermore, the ON time detecting portion 44 compares the measured terminal voltage and the first threshold voltage Vth1, and calculates a first ON time $\tau 01$ wherein the first switching element 31 is in a conductive state, and compares the measured terminal voltage and the second threshold voltage Vth2, and calculates a second ON time $\tau 02$, wherein the second switching element 32 is in a conductive state.

Note that the magnitude of the offset for the first threshold voltage Vth1 may or may not be the same as the magnitude of the offset for the second threshold voltage Vth2.

Figure 9:
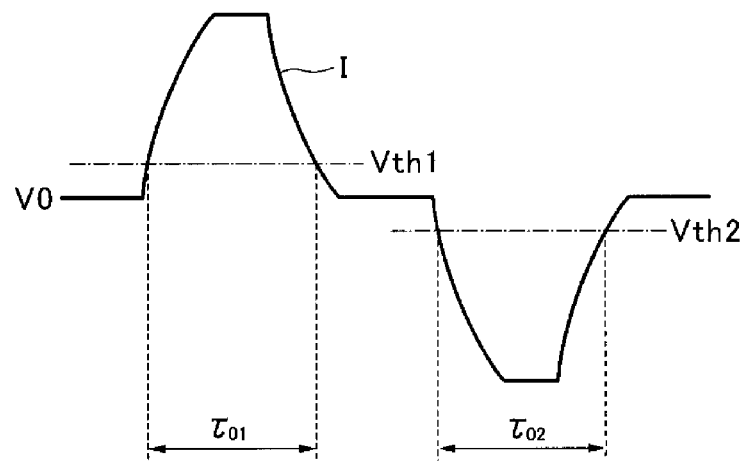
FIG. 9 is a waveform diagram of the terminal voltage of the intermediate node 102 of the first and second switching elements 31 and 32 in the third form of embodiment according to the present invention.

Here the terminal voltage of the intermediate node 102 between the first and second switching elements 31 and 32 is illustrated in FIG. 9 with the curve I. In the MOSFETs that structure the first and second switching elements 31 and 32, the change in the drain current relative to the change in the gate driving voltage is known to follow, to some degree, a time delay. Because of this, the voltage waveform of the terminal voltage will have a distorted shape, as illustrated in the curve I. The result is that the ratio of the conductive time of the first switching element 31 and the conductive time of the second switching element 32 may be shifted away from an accurate inverse of the ratio of the number of storage cells included in the first closed circuit and the number of storage cells included in the second closed circuit.

Given this, in the present form of embodiment, the ON time detecting portion 44 calculates the time over which the terminal voltage indicated by the curve I exceeds the first threshold voltage Vth1 as the first ON time $\tau 01$, and calculates the time over which the terminal voltage is less than the second threshold voltage Vth2 as the second ON time $\tau 02$. Additionally, a driving signal outputting portion 41 performs feedback control of the driving signal so that the ratio of the first ON time $\tau 01$ and the second ON time $\tau 02$ will be the inverse of the ratio of the number of storage cells included in the first closed circuit and the number of storage cells included in the second closed circuit. For example, if the ratio of the numbers of storage cells is 1:1, then feedback control is performed so that the first ON time $\tau 01$ will be equal to the second ON time $\tau 02$. In the third form of embodiment, the feedback control can be performed easily, because there is only a single pair of first and second switching elements 31 and 32 regardless of the number of storage cells that structure the battery pack.

Note that the ON time detecting portion 44 may perform feedback control on the driving signal so that the ratio of the area encompassed by the curve I that indicates the terminal voltage and the line that indicates the first threshold voltage Vth1 and the area encompassed by the curve I and the line that indicates the second threshold voltage Vth2 will be the inverse of the ratio of the number of storage cells included in the first closed circuit and the number of storage cells included in the second closed circuit.

Figure 10:
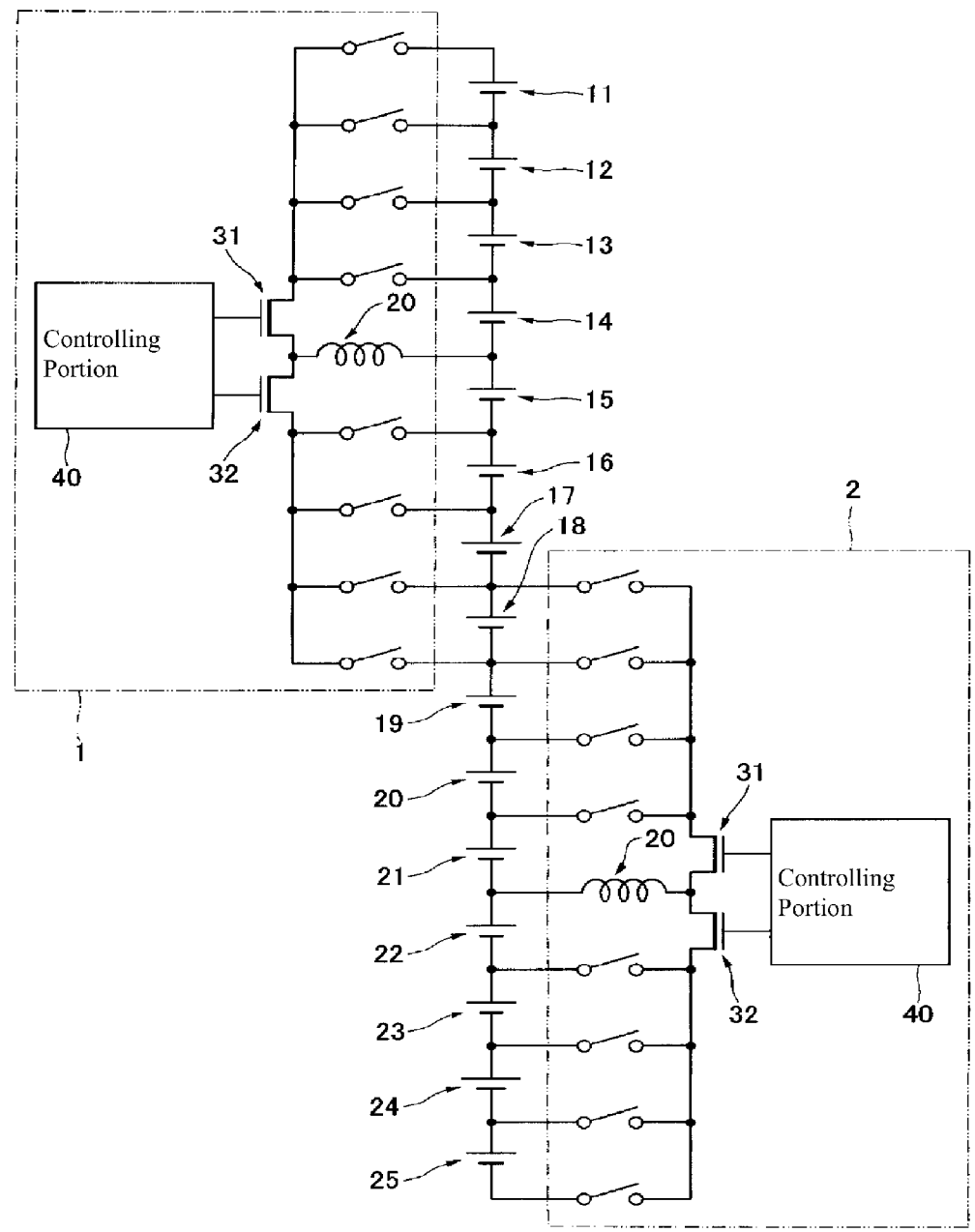
FIG. 10 is a circuit diagram of a remaining capacity equalizing device set according to a fourth form of embodiment according to the present invention.

An example of embodiment of a first remaining capacity equalizing device set according to the present invention will be explained next in reference to FIG. 10. FIG. 10 is a circuit diagram of a remaining capacity equalizing device set according to the fourth form of embodiment.

As illustrated in FIG. 10, the remaining capacity equalizing device according to the fourth form of embodiment is a remaining capacity equalizing device set structured from two remaining capacity equalizing devices 1 and 2 that equalize the remaining capacities of 15 storage cells 11 through 25 that are connected in parallel to structure a battery pack set wherein two battery packs are connected in series.

The first remaining capacity equalizing device 1 is for equalizing the remaining capacities of the first battery pack that is structured from the storage cells 11 to 18 that are connected in series in the battery pack set. The second remaining capacity equalizing device 2 is for equalizing the remaining capacities of the second battery pack that is structured from the storage cells 18 to 25 that are connected in series in the battery pack set.

The two remaining capacity equalizing devices 1 and 2 each operate independently as explained in the first form of embodiment to equalize respectively the remaining capacities of the storage cells that are included in the individual battery packs. At this time, the storage cell 18 is included in common in both of the battery packs, and thus the remaining capacities of all of the storage cells 11 to 25 that are included in the battery pack set, which comprises the two battery packs, are equalized.

Note that the two remaining capacity equalizing device is 1 and 2 may operate simultaneously, or may operate alternatingly. Furthermore, the number of storage cells shared by the two battery packs may be two or more. Additionally, the numbers of storage cells handled by each of the two remaining capacity equalizing devices or means may or may not be identical to each other. Moreover, the remaining capacity equalization may be achieved through dividing the storage cells of the battery pack set using three or more remaining capacity equalizing means.

In this way, the voltages that are applied to the first and second switching elements in the remaining capacity equalizing means can be moderated by performing the remaining capacity equalization through handling the storage cells of the battery pack set using two remaining capacity equalizing means. For example, when a battery pack wherein 100 storage cells having a 4V voltage each are connected in series is equalized using a single remaining capacity equalizing means, the first and second switching elements 31 and 32 therein must be able to withstand 400 V. However, if the battery pack is handled by two remaining capacity equalizing means, then the withstand voltage required in the first and second switching elements of each of the equalizing means is reduced to 200 V. Furthermore, if the equalization of the battery pack is performed using four remaining capacity equalizing means, then the withstand voltage required in the first and second switching elements in each of the equalizing means will be reduced to 100V.

Figure 11:
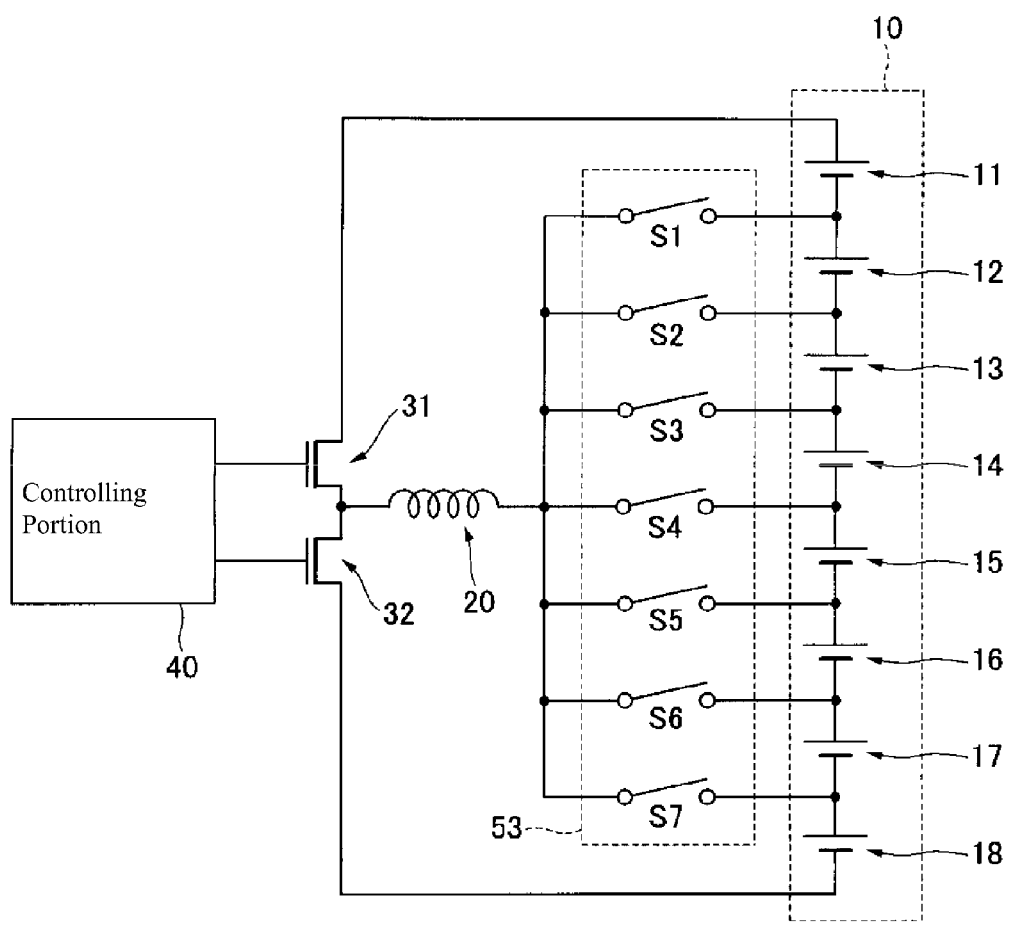
FIG. 11 is a circuit diagram of a remaining capacity equalizing device according to a fifth form of embodiment according to the present invention.

First a form of embodiment of a second remaining capacity equalizing device and a second remaining capacity equalizing element according to the present invention will be explained in reference to FIG. 11 through FIG. 14. FIG. 11 is a circuit diagram of a remaining capacity equalizing device according to the fifth form of embodiment.

The remaining capacity equalizing device according to the first form of embodiment is for equalizing the remaining capacity (SOC) of eight storage cells 11 through 18 that are connected in series to structure a battery pack 10.

Note that while FIG. 11 illustrates an example of a battery pack 10 wherein eight storage cells 11 to 18 are connected in series, the number of storage cells is not limited thereto. The number of storage cells is preferably no less than three, and more preferably no less than four.

One end of the first switching element 31 is connected to the highest voltage terminal of the battery pack 10, or in other words, connected to the high-voltage-side terminal of the storage cell 11. Additionally, one end of the second switching element 32 is connected to the lowest voltage terminal of the battery pack 10, that is, to the low-voltage-side terminal of the storage cell 18. Furthermore, one end of an inductance 20 is connected to the other ends of the first and second switching elements 31 and 32, that is, connected between the first switching element 31 and the second switching element 32. The other end of the inductance 20 is connected to each of the nodes in the plurality of storage cells through a switching switch group 53.

Furthermore, the ON/OFF switching of the first and second switching elements 31 and 32, and the ON/OFF switching of the individual switching switches S1 through S7 of the switching switch group 53 are controlled by the controlling portion 40.

Note that in FIG. 1, the control signals for controlling the respective ON/OFF switching of the individual switching switches S1 through S7 that structure the switching switch group 53, and the wiring that extends from the controlling portion 40 to the individual switching switches S1 through S7 are omitted.

The controlling portion 40 sequentially selects and places in a conductive state (ON), one at a time, a first switching switch from among the switching switches S1 through S7 that structure the switching switch group 53. A first closed circuit that includes the selected switching switch, the storage cells that are connected on the high-voltage side of the node to which the switching switch is connected, the first switching element 31, and the inductance 20 is formed through the selected switching switch assuming the conductive state. Simultaneously, a second closed circuit is formed including the selected switching switch, the storage cells that are connected on the low-voltage side of the node to which the switching switch is connected, the second switching element 32, and the inductance 20.

The controlling portion sequentially selects switching switches S1 through S7 as described in the example of operation below so that the combination of the first and second closed circuits will be switched with every specified interval T=100 ms.

Note that the specified intervals, in principle, may be of mutually identical lengths for each combination of first and second closed circuits, or may be of mutually differing lengths. For example, if there is a large discrepancy between the remaining capacity of the storage cells included in the first closed circuit and the remaining capacity of the storage cells included in the second closed circuit, then the conductive time for that combination may be longer than the conductive times for other combinations.

The controlling portion 40 also turns ON/OFF the first and second switching elements 31 and 32 alternatingly. In the present form of embodiment, the first switching element 31 and the second switching element 32 turn ON and OFF with a period of $\tau$=5 μs, that is, a frequency f=200 kHz.

Here the controlling portion 40, as explained in detail below, turns the first and second switching elements 31 and 32 ON/OFF alternatingly so that the ratio of the conductive time of the first switching element 31 and the conductive time of the second switching element 32 is the inverse of the ratio of the number of storage cells included in the first closed circuit and the number of storage cells included in the second closed circuit.

Additionally, the controlling portion 40 repeats the cycle of sequentially selecting the switching switches S1 through S7.

Note that in a case wherein the battery pack is mounted in an automobile, this cycle preferably is repeated while the automobile power switch is turned ON, or repeated while the battery pack is connected to a charging device that is external to the automobile.

An example of the operation of the equalizing device of the fifth form of embodiment, that is, an example of the first remaining capacity equalizing method, will be explained next in reference to the timing charts in FIG. 12 through FIG. 14.

Figure 12:
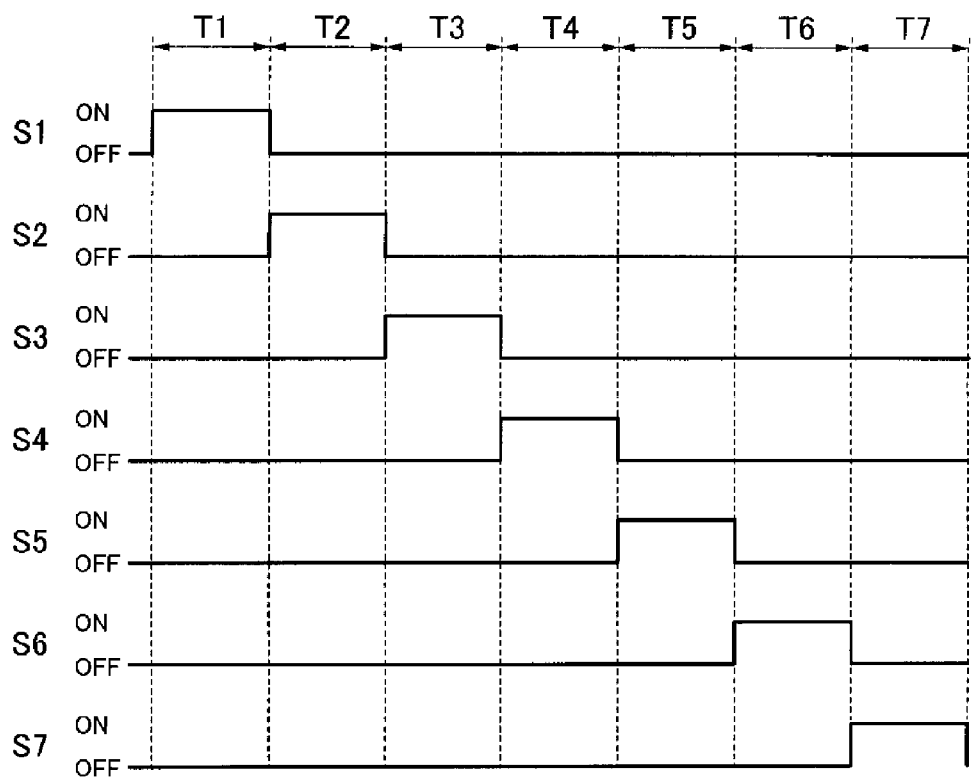
FIG. 12 is a timing chart of the ON/OFF switching of the switching switches in the remaining capacity equalizing device according to the fifth form of embodiment according to the present invention.

First, as illustrated in FIG. 12, during the interval T1, the switching switch S1, selected from the switching switch group 53 are both in a conductive state (ON). The result, in FIG. 11, is the formation of the first closed circuit that includes the first switching element 31, the inductance 20, the switching switch S1, and the storage cell 11, and, at the same time, the formation of the second closed circuit that includes the second switching element 32, the inductance 20, the switching switch S1, and seven storage cells 12 to 18.

Figure 13:
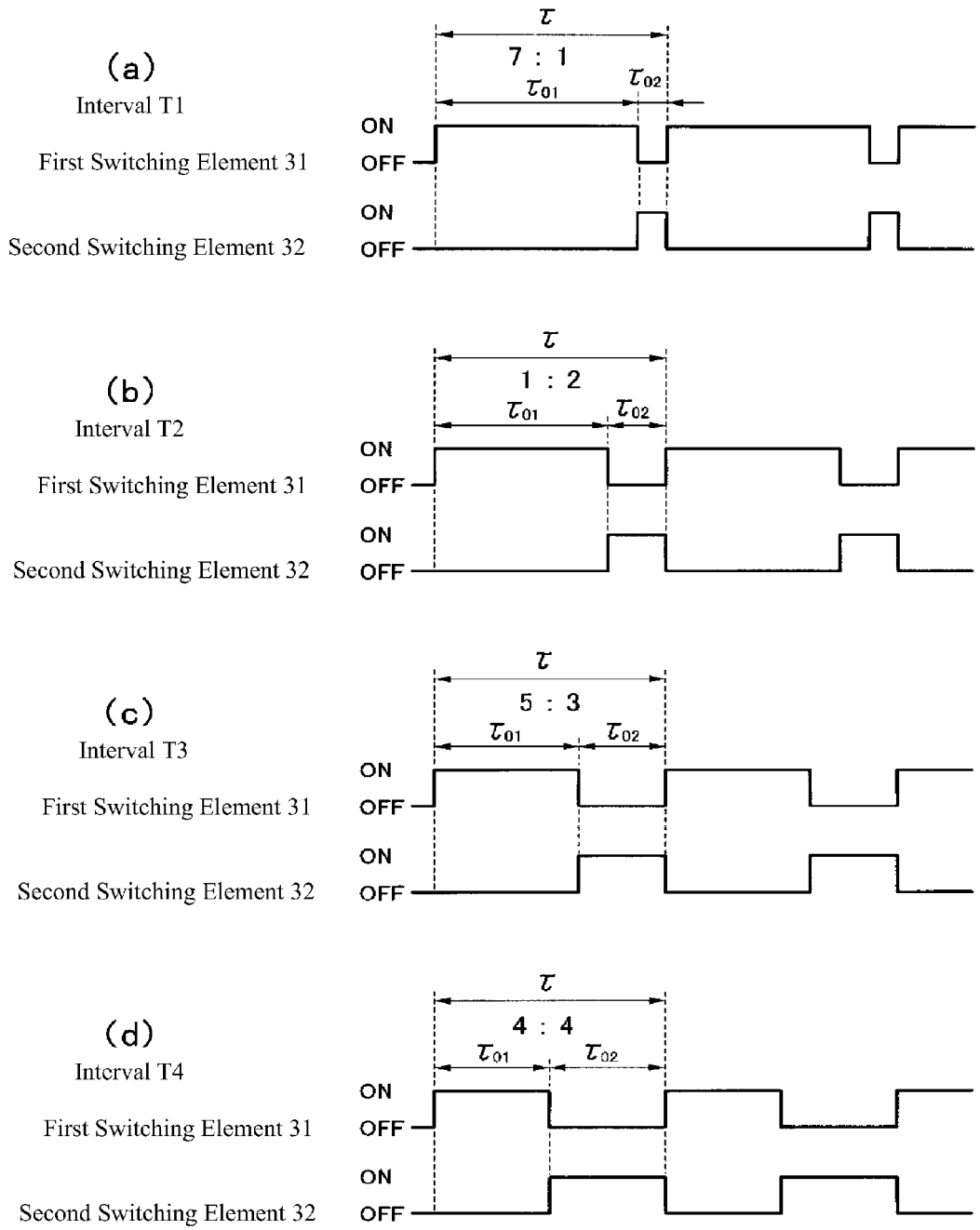
FIG. 13 is a timing chart of the ON/OFF switching of the first switching element 31 and the second switching element 32 in the remaining capacity equalizing device according to the fifth form of embodiment according to the present invention.

Here the timing chart for the ON/OFF switching of the first switching element 31 and the second switching element 32 during the interval T1 is illustrated schematically in FIG. 13 (*a*).

The number of storage cells included in the first closed circuit during the interval T1 is 1, and the number of storage cells included in the second closed circuit is 7. Because of this, during the interval T1, the first and second switching elements are turned ON/OFF alternatingly so that the ratio of the conductive time of the first switching element 31 and the conductive time of the second switching element 32 is the inverse of the ratio 1:7 of the number of storage cells included in the first closed circuit, which is 1, and the number of storage cells included in the second closed circuit, which is 7.

Consequently, the ratio of the conductive time of the first switching element 31 and the conductive time of the second switching element 32 is 7:1.

That is, during the interval T1, the first switching element 31 is in a conductive state only during the ON time of τ01 with a duty ratio of about 87.5% of the period τ, and the second switching element 32 is in a conductive state only during the ON time τ02 of a duty cycle of the remaining approximately 12.5% of the period τ.

Note that in order to prevent the first and second switching elements 31 and 32 from being in the conductive state simultaneously, a dead time is provided between the ON time τ01 and the ON time τ02. This dead time is, for example, 500 ns.

By alternatingly opening and closing, with a ratio of 7:1, the first and second switching elements 31 and 32 during the interval T1 in this way, the voltage V11 of the storage cell 11 in the first closed circuit will become equal to ⅐ of the total voltage (V12+V13+V14+V15+V16+V17+V18) of the seven storage cells 12 through 18 in the second closed circuit. This results in V11=(V12+V13+V14+V15+V16+V17+V18)×(⅐).

Next, as illustrated in FIG. 12, during the interval T2, the switching switch S2, newly selected from the switching switch group 53, goes into a conductive state (ON). The result, in FIG. 11, is the formation of the first closed circuit that includes the first switching element 31, the inductance 20, the switching switch S2, and the two storage cells 11 and 12, and, at the same time, the formation of the second closed circuit that includes the second switching element 32, the inductance 20, the switching switch S2, and six storage cells 13 through 18.

Here the timing chart for the ON/OFF switching of the first switching element 31 and the second switching element 32 during the interval T2 is illustrated schematically in FIG. 13(b).

The number of storage cells included in the first closed circuit during the interval T2 is 2, and the number of storage cells included in the second closed circuit is 6. Because of this, during the interval T2, the first and second switching elements are turned ON/OFF alternately so that the ratio of the conductive time of the first switching element 31 and the conductive time of the second switching element 32 is the inverse of the ratio 2:6 of the number of storage cells included in the first closed circuit, which is 2, and the number of storage cells included in the second closed circuit, which is 6. Consequently, the ratio of the conductive time of the first switching element 31 and the conductive time of the second switching element 32 is 6:2.

That is, during the interval T2, the first switching element 31 is in a conductive state only during the ON time of τ01 with a duty ratio of 75% of the period τ, and the second switching element 32 is in a conductive state only during the ON time τ02 of a duty cycle of the remaining 25% of the period τ.

By alternatingly opening and closing, with a ratio of 6:2, the first and second switching elements 31 and 32 during the interval T2 in this way, the total voltage (V11+V12) of the two storage cells 11 and 12 in the first closed circuit will become equal to ⅖ of the total voltage (V13+V14+V15+V16+V17+V18) of the six storage cells 13 through 18 in the second closed circuit. This results in (V11+V12)=(V13+V14+V15+V16+V17+V18)×(⅖).

Next, as illustrated in FIG. 12, during the interval T3, the switching switch S3, newly selected from the switching switch group 53, goes into a conductive state (ON). The result, in FIG. 11, is the formation of the first closed circuit that includes the first switching element 31, the inductance 20, the switching switch S3, and the three storage cells 11 through 13, and, at the same time, the formation of the second closed circuit that includes the second switching element 32, the inductance 20, the switching switch S3, and five storage cells 14 through 18.

Here the timing chart for the ON/OFF switching of the first switching element 31 and the second switching element 32 during the interval T3 is illustrated schematically in FIG. 13(c).

The number of storage cells included in the first closed circuit during the interval T3 is 3, and the number of storage cells included in the second closed circuit is 5. Because of this, during the interval T3, the first and second switching elements are turned ON/OFF alternately so that the ratio of the conductive time of the first switching element 31 and the conductive time of the second switching element 32 is the inverse of the ratio 3:5 of the number of storage cells included in the first closed circuit, which is 3, and the number of storage cells included in the second closed circuit, which is 5. Consequently, the ratio of the conductive time of the first switching element 31 and the conductive time of the second switching element 32 is 5:3.

That is, during the interval T3, the first switching element 31 is in a conductive state only during the ON time of τ01 with a duty ratio of 62.5% of the period τ, and the second switching element 32 is in a conductive state only during the ON time τ02 of a duty cycle of the remaining 37.5% of the period τ.

By alternatingly opening and closing, with a ratio of 5:3, the first and second switching elements 31 and 32 during the interval T3 in this way, the total voltage (V11+V12+V13) of the three storage cells 11 through 13 in the first closed circuit will become equal to ⅗ of the total voltage (V14+V15+V16+V17+V18) of the five storage cells 14 through 18 in the second closed circuit. This results in (V11+V12+V13)=(V14+V15+V16+V17+V18)×(⅗).

Next, as illustrated in FIG. 12, during the interval T4, the switching switch S4, newly selected from the switching switch group 53, goes into a conductive state (ON). The result, in FIG. 11, is the formation of the first closed circuit that includes the first switching element 31, the inductance 20, the switching switch S4, and the four storage cells 11 through 14, and, at the same time, the formation of the second closed circuit that includes the second switching element 32, the inductance 20, the switching switch S4, and four storage cells 15 through 18.

Here the timing chart for the ON/OFF switching of the first switching element 31 and the second switching element 32 during the interval T4 is illustrated schematically in FIG. 13(d).

The number of storage cells included in the first closed circuit during the interval T4 is 4, and the number of storage cells included in the second closed circuit is 4. Because of this, during the interval T4, the first and second switching elements are turned ON/OFF alternately so that the ratio of the conductive time of the first switching element 31 and the conductive time of the second switching element 32 is the inverse of the ratio 4:4 of the number of storage cells included in the first closed circuit, which is 4, and the number of storage cells included in the second closed circuit, which is 4. Consequently, the ratio of the conductive time of the first switching element 31 and the conductive time of the second switching element 32 is 1:1.

That is, during the interval T4, the first switching element 31 is in a conductive state only during the ON time of τ01 with a duty ratio of 50% of the period τ, and the second switching element 32 is in a conductive state only during the ON time τ02 of a duty cycle of the remaining 50% of the period τ.

By alternatingly opening and closing, with a ratio of 1:1, the first and second switching elements 31 and 32 during the interval T4 in this way, the total voltage (V11+V12+V13+V14) of the four storage cells 11 through 14 in the first closed circuit will become equal to the total voltage (V15+V16+V17+V18) of the four storage cells 15 through 18 in the second closed circuit. This results in (V11+V12+V13+V14)=(V15+V16+V17+V18).

Next, as illustrated in FIG. 12, during the interval T5, the switching switch S5, newly selected from the switching switch group 53, goes into a conductive state (ON). The result, in FIG. 11, is the formation of the first closed circuit that includes the first switching element 31, the inductance 20, the switching switch S5, and the five storage cells 11 through 15, and, at the same time, the formation of the second closed circuit that includes the second switching element 32, the inductance 20, the switching switch S5, and three storage cells 16 through 18.

Figure 14:
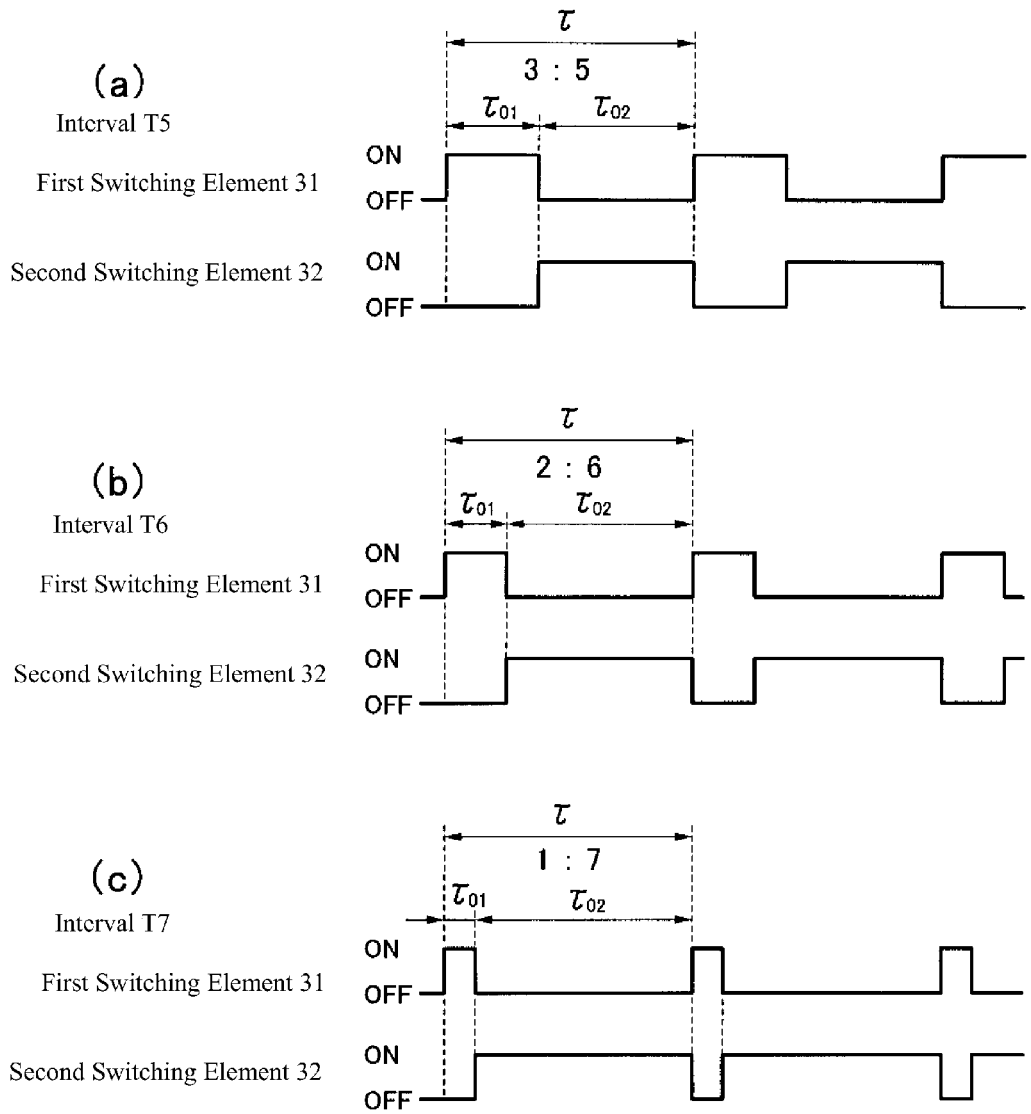
FIG. 14 is a timing chart of the ON/OFF switching of the first switching element 31 and the second switching element 32 in the remaining capacity equalizing device according to the fifth form of embodiment according to the present invention.

Here the timing chart for the ON/OFF switching of the first switching element 31 and the second switching element 32 during the interval T5 is illustrated schematically in FIG. 14(*a*).

The number of storage cells included in the first closed circuit during the interval T5 is 5, and the number of storage cells included in the second closed circuit is 3. Because of this, during the interval T5, the first and second switching elements are turned ON/OFF alternatingly so that the ratio of the conductive time of the first switching element 31 and the conductive time of the second switching element 32 is the inverse of the ratio 5:3 of the number of storage cells included in the first closed circuit, which is 5, and the number of storage cells included in the second closed circuit, which is 3. Consequently, the ratio of the conductive time of the first switching element 31 and the conductive time of the second switching element 32 is 3:5.

That is, during the interval T5, the first switching element 31 is in a conductive state only during the ON time of τ01 with a duty ratio of 37.5% of the period τ, and the second switching element 32 is in a conductive state only during the ON time τ02 of a duty cycle of the remaining 62.5% of the period τ.

By alternatingly opening and closing, with a ratio of 3:5, the first and second switching elements 31 and 32 during the interval T5 in this way, the total voltage (V11+V12+V13+V14+V15) of the five storage cells 11 through 15 in the first closed circuit will become equal to 5/3 of the total voltage (V16+V17+V18) of the three storage cells 16 through 18 in the second closed circuit. This results in (V11+V12+V13+V14+V15)=(V16+V17+V18)×(5/3).

Next, as illustrated in FIG. 12, during the interval T7, the switching switch S7, newly selected from the switching switch group 53, goes into a conductive state (ON). The result, in FIG. 11, is the formation of the first closed circuit that includes the first switching element 31, the inductance 20, the switching switch S7, and the six storage cells 11 through 16, and, at the same time, the formation of the second closed circuit that includes the second switching element 32, the inductance 20, the switching switch S6, and two storage cells 17 and 18.

Here the timing chart for the ON/OFF switching of the first switching element 31 and the second switching element 32 during the interval T6 is illustrated schematically in FIG. 14(*b*).

The number of storage cells included in the first closed circuit during the interval T6 is 6, and the number of storage cells included in the second closed circuit is 2. Because of this, during the interval T6, the first and second switching elements are turned ON/OFF alternatingly so that the ratio of the conductive time of the first switching element 31 and the conductive time of the second switching element 32 is the inverse of the ratio 6:2 of the number of storage cells included in the first closed circuit, which is 6, and the number of storage cells included in the second closed circuit, which is 2. Consequently, the ratio of the conductive time of the first switching element 31 and the conductive time of the second switching element 32 is 2:6.

That is, during the interval T6, the first switching element 31 is in a conductive state only during the ON time of τ01 with a duty ratio of 25% of the period τ, and the second switching element 32 is in a conductive state only during the ON time τ02 of a duty cycle of the remaining 75% of the period τ.

By alternatingly opening and closing, with a ratio of 2:6, the first and second switching elements 31 and 32 during the interval T6 in this way, the total voltage (V11+V12+V13+V14+V15+V16) of the six storage cells 11 through 16 in the first closed circuit will become equal to 6/2 of the total voltage (V17+V18) of the two storage cells 17 and 18 in the second closed circuit. This results in (V11+V12+V13+V14+V15+V16)=(V17+V18)×(6/2).

Next, as illustrated in FIG. 12, during the interval T8, the switching switch S8, newly selected from the switching switch group 53, goes into a conductive state (ON). The result, in FIG. 11, is the formation of the first closed circuit that includes the first switching element 31, the inductance 20, the switching switch S8, and the seven storage cells 11 through 17, and, at the same time, the formation of the second closed circuit that includes the second switching element 32, the inductance 20, the switching switch S6, and one storage cell 18.

Here the timing chart for the ON/OFF switching of the first switching element 31 and the second switching element 32 during the interval T7 is illustrated schematically in FIG. 14(*c*).

The number of storage cells included in the first closed circuit during the interval T7 is 7, and the number of storage cells included in the second closed circuit is 1. Because of this, during the interval T7, the first and second switching elements are turned ON/OFF alternatingly so that the ratio of the conductive time of the first switching element 31 and the conductive time of the second switching element 32 is the inverse of the ratio 7:1 of the number of storage cells included in the first closed circuit, which is 7, and the number of storage cells included in the second closed circuit, which is 1. Consequently, the ratio of the conductive time of the first switching element 31 and the conductive time of the second switching element 32 is 1:7.

That is, during the interval T7, the first switching element 31 is in a conductive state only during the ON time of τ01 with a duty ratio of 12.5% of the period τ, and the second switching element 32 is in a conductive state only during the ON time τ02 of a duty cycle of the remaining 87.5% of the period τ.

By alternatingly opening and closing, with a ratio of 1:7, the first and second switching elements 31 and 32 during the interval T7 in this way, the total voltage (V11+V12+V13+V14+V15+V16+V17) of the seven storage cells 11 through 17 in the first closed circuit will become equal to 7/2 of the voltage V18 of the storage cell 18 in the second closed circuit. This results in (V11+V12+V13+V14+V15+V16+V17)=V18×7.

Given this, through the repetition of the cycle for the intervals T1 through T7, above, the remaining capacities of the individual storage cells 11 to 18, that is, the voltages V11 through V18 converge so as to be identical. That is, in essence, the result is V11=V12=V13=V14=V15=V16=V17=V18.

Doing so makes it possible to achieve equalization of the remaining capacities of the individual storage cells 11 to 18.

As described above, the remaining capacity equalizing device and method according to the present invention enables the achievement of equalization of the remaining capacities of a plurality of storage cells that are connected in series to structure a battery pack, through the use of a single inductance and a pair of switching elements. Given this, even if the number of storage cells is increased, there is no need to increase the number of inductances or switching elements. Because of this, even if there is an increase in the number of storage cells, it is possible to avoid increases in equipment dimensions and cost, and possible to avoid increases in the noise due to the switching elements.

Furthermore, while in the present form of embodiment an example wherein the remaining capacities of eight storage cells were equalized, the number of storage cells is not limited thereto, but rather it is also possible to equalize, for example, the remaining capacities of 100 or more storage cells that are connected in series.

Furthermore, while the explanation in the present form of embodiment was for an example wherein the conductive state was formed sequentially starting with the switching switch S1 on the highest voltage terminal side, in the present invention, the selection sequence for the switching switches is not limited thereto, and, for example, the switching switches may be selected sequentially from the switching switch S7 on the lowest battery, or lowest voltage, terminal side. Moreover, all of the switching switches may be selected sequentially, or a cycle may be repeated wherein only a portion of the switching switches is selected sequentially.

Additionally, the technology set forth in the second form of embodiment, described above, may be combined with the remaining capacity equalizing device according to the fifth form of embodiment, set forth above. That is, in the residual capacity equalizing means set forth in the fifth form of embodiment, the controlling portion 40 may cause the respective conductive times $\tau 01$ and $\tau 02$ of the first and second switching elements in one ON/OFF period of the first and second switching elements 31 and 32 be short during the initial period of the specified interval, while maintaining the ratio of the conductive time $\tau 01$ of the first switching element 31 and the conductive time $\tau 02$ of the second switching element 32, during the specified interval, for each combination of first and second closed circuits, and may gradually increase these conductive times as time elapses.

Additionally, the technology set forth in the third form of embodiment, described above, may be combined with the remaining capacity equalizing device according to the fifth form of embodiment, set forth above. That is, in the operating means of the remaining capacity equalizing means as set forth in the fifth form of embodiment, the controlling portion 40 may perform feedback control of the driving signals that control the ON/OFF switching of the first and second switching elements so that the ratio of the first ON time $\tau 01$ wherein the first switching element 31 is in a conductive state and the second ON time $\tau 02$ wherein the second switching element 32 is in a conductive state will be the inverse of the ratio of the number of storage cells included in the first closed circuit and the number of storage cells included in the second closed circuit.

Note that when charging a battery pack that is connected to the remaining capacity equalizing device according to the fifth form of embodiment, this remaining capacity equalizing device may be used to change the charging voltages of the individual battery packs.

In a case wherein one of the storage cells that comprise the battery pack is fully charged, the temperature of that storage cell would increase if charging were to be performed past the full charge. Typically, the charging is terminated when the temperature of a storage cell increases and there is a notification that a specific value has been reached. In such a case, there may be other storage cells that are connected in series that are not fully charged. Given this, the use of this remaining capacity equalizing device can enable continuous charging, to the application of a specific voltage to the remaining storage cells, while reducing the charge voltage target value of the storage cells that have become fully charged and have become hot, thereby suppressing the production of heat.

In the case illustrated in FIG. 11 wherein the lowest voltage terminal of the battery pack 10 is connected to ground and an external charging device is connected to the highest voltage terminal, a total voltage Va is applied to the battery pack 10. Here ⅛ of the total voltage Va can be charged into the storage cell 18 through connecting the switching switch S7 and alternatingly causing the first and second switching elements 31 and 32 to assume the conductive state with a ratio of 1:7. In this case, the ratio can be adjusted to charge the storage cell 18 to an arbitrary voltage.

Following this, the switching switch S6 is connected and the ratio of times over which the first and second switching elements 31 and 32 are placed alternatingly into the conductive state are adjusted so as to charge with a voltage that is a voltage $\alpha$ added to the voltage of the storage cell 18 (Va/8+$\alpha$). The result is that the storage cell 17 is charged with a voltage $\alpha$ 3 and 4. In this way, it is possible to control individually the voltages of the individual storage cells using the remaining capacity equalizing device according to the fifth form of embodiment.

Figure 15:
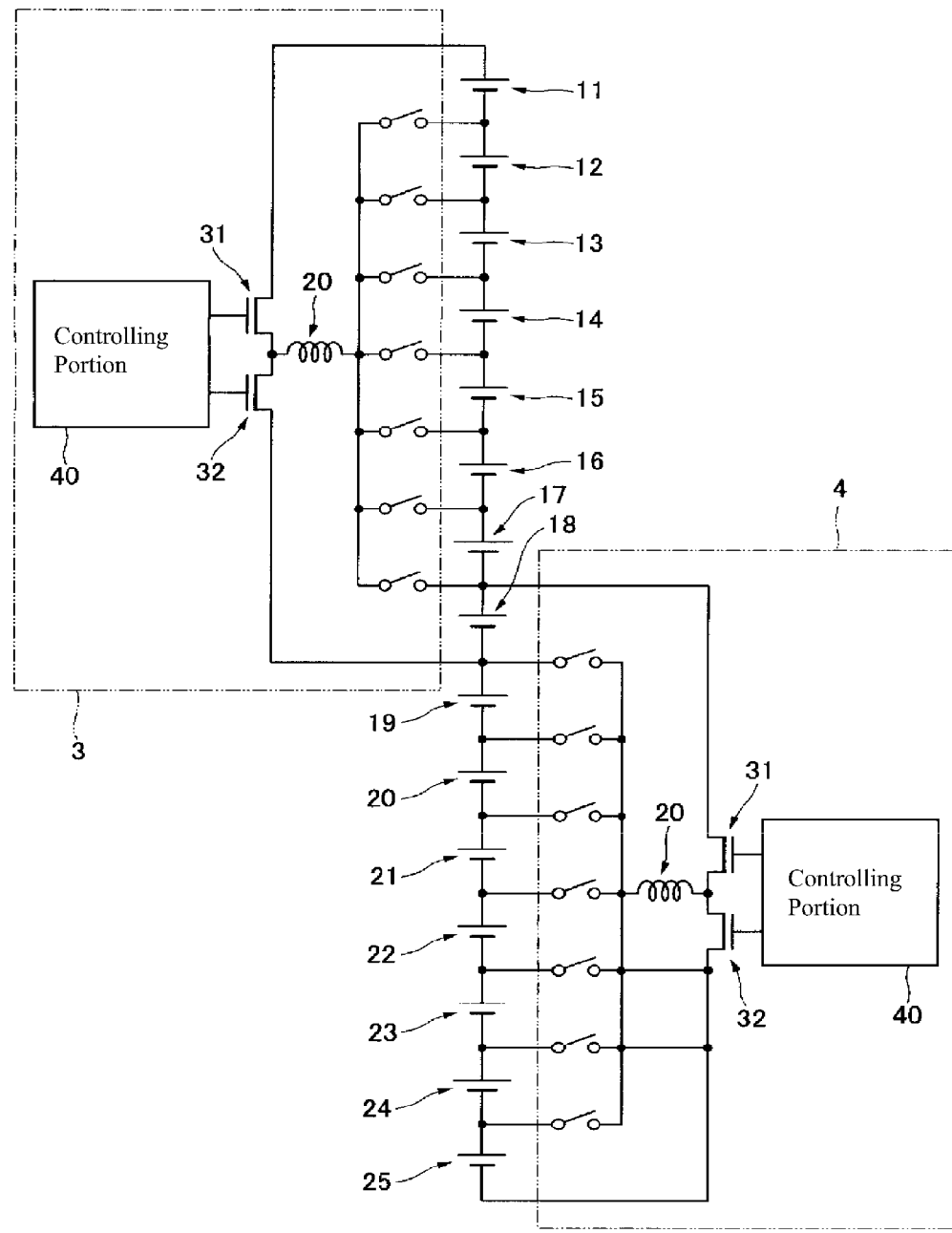
FIG. 15 is a circuit diagram of a remaining capacity equalizing device set according to a sixth form of embodiment according to the present invention.

An example of embodiment of a second remaining capacity equalizing device set according to the present invention will be explained next in reference to FIG. 15. FIG. 15 is a circuit diagram of a remaining capacity equalizing device set according to the sixth form of embodiment.

As illustrated in FIG. 15, the remaining capacity equalizing device according to the sixth form of embodiment is a remaining capacity equalizing device set structured from two remaining capacity equalizing devices 1 and 2 that equalize the remaining capacities of 15 storage cells 11 through 25 that are connected in parallel to structure a battery pack set wherein two battery packs are connected in series.

The first remaining capacity equalizing device 3 is for equalizing the remaining capacities of the first battery pack that is structured from the storage cells 11 to 18 that are connected in series in the battery pack set. The second remaining capacity equalizing device 4 is for equalizing the remaining capacities of the second battery pack that is structured from the storage cells 18 to 25 that are connected in series in the battery pack set.

The two remaining capacity equalizing devices 3 and 4 each operate independently as explained in the fifth form of embodiment to equalize respectively the remaining capacities of the storage cells that are included in the individual battery packs. At this time, the storage cell 18 is included in common in both of the battery packs, and thus the remaining capacities of all of the storage cells 11 to 25 that are included in the battery pack set, which comprises the two battery packs, are equalized.

Note that the two remaining capacity equalizing device is 3 and 4 may operate simultaneously, or may operate alternatingly. Furthermore, the number of storage cells shared by the two battery packs may be two or more. Additionally, the numbers of storage cells handled by each of the two remaining capacity equalizing means may or may not be identical to each other. Moreover, the remaining capacity equalization may be achieved through dividing the storage cells of the battery pack set using three or more remaining capacity equalizing means.

In this way, the voltages that are applied to the first and second switching elements in the remaining capacity equalizing means can be moderated by performing the remaining capacity equalization through handling the storage cells of the battery pack set using two remaining capacity equalizing means. For example, when a battery pack wherein 100 storage cells having a 4V voltage each are connected in series is equalized using a single remaining capacity equalizing means, the first and second switching elements 31 and 32 therein must be able to withstand 400 V. However, if the battery pack is handled by two remaining capacity equalizing means, then the withstand voltage required in the first and second switching elements of each of the equalizing means is reduced to 200 V. Furthermore, if the equalization of the battery pack is performed using four remaining capacity equalizing means, then the withstand voltage required in the first and second switching elements in each of the equalizing means will be reduced to 100V.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. A remaining capacity equalizing device for equalizing the remaining capacities of a plurality of storage cells that are connected in series to form a battery pack, comprising:
   an inductance having one end thereof connected to a reference node between mutually adjacent storage cells in the battery pack;
   first and second switching elements having one end each thereof connected to the other end of the inductance;
   a first switching switch group able to connect the other end of the first switching element to a high-voltage-side node of each storage cell of the battery pack that is connected on the high-voltage side of the reference node;
   a second switching switch group able to connect the other end of the second switching element to a low-voltage-side node of each storage cell of the battery pack that is connected on the low-voltage side of the reference node; and
   a controlling portion for controlling the ON/OFF switching of the first and second switching elements and the first and second switching switch groups;
   wherein:
   the controlling portion:
      selects and puts into a conductive state, one at a time, first switching switches from the first switching switch group, to form a first closed circuit that includes the selected first switching switch, the storage cells between the reference node and the high-voltage-side node to which the first switching switch is connected, the first switching element, and the inductance;
      selects and puts into a conductive state, one at a time, second switching switches from the second switching switch group, to form a second closed circuit that includes the selected second switching switch, the storage cells between the reference node and the low-voltage-side node to which the second switching switch is connected, the second switching element, and the inductance;
      alternatingly turns ON/OFF the first and second switching elements so that, for each combination of first and second closed circuits that are determined respectively by the selections of the first and second switching switches, the ratio of the conductive time of the first switching switch and the conductive time of the second switching switch during a specified interval is the inverse of the ratio of the number of storage cells included in the first closed circuit and the number of storage cells included in the second closed circuit; and
      repeats a cycle wherein the first and second switching switches are switched sequentially.

2. A remaining capacity equalizing device as set forth in claim 1, wherein:
   the controlling portion, for each combination of the first and second closed circuits, shortens, during the initial period of the specified interval, the respective conductive times for the first and second switching elements in one ON/OFF period of the first and second switching elements, while maintaining the ratio of the conductive time of the first switching element and the conductive time of the second switching element during the specific interval, and then lengthens these conductive times as time elapses.

3. A remaining capacity equalizing device as set forth in claim 1 or claim 2, wherein:
   the controlling portion comprises:
      a driving signal outputting portion for outputting a driving signal for turning ON/OFF the first and second switching elements;
      a voltage measuring portion for measuring a terminal voltage at the other end of the inductance;
      a threshold value setting portion for setting a first threshold voltage provided with a specific offset on the high-voltage side, relative to an intermediate voltage, and a second threshold voltage provided with a specific offset on the low-voltage side, relative to the intermediate voltage, with the terminal voltage when both the first and second switching elements are simultaneously in the non-conductive state as the intermediate voltage; and
      an ON time detecting portion for comparing the measured terminal voltage and the first threshold voltage to calculate a first ON time wherein the first switching element is in a conductive state, and for comparing the measured terminal voltage and the second threshold voltage to calculate a second ON time wherein the second switching element is in a conductive state; and wherein:
the driving signal outputting portion performs feedback control of the driving signal so that the ratio of the first ON time and the second ON time will be the inverse of the ratio of the number of storage cells included in the first closed circuit and the number of storage cells included in the second closed circuit.

4. A remaining capacity equalizing device set for equalizing the remaining capacities of a plurality of storage cells that are connected in series to structure a set of battery packs wherein a plurality of battery packs is connected in series, wherein:
a remaining capacity equalizing device as set forth in claim 1 is provided for each individual battery pack; and
adjacent battery packs share at least one storage cell.

5. A remaining capacity equalizing method for equalizing the remaining capacities of a plurality of storage cells that are connected in series to form a battery pack, wherein:
a first closed circuit is formed including an inductance having one end thereof connected to a reference node between mutually adjacent storage cells of the battery pack, a first switching element having one end thereof connected to the other end of the inductance, a first switching switch for connecting the other end of the first switching element and one high-voltage-side node selected from the high-voltage-side nodes of the individual storage cells connected on the high-voltage side of the reference node of the battery pack, and the storage cells between the reference node and the selected high-voltage-side node;
a second closed circuit is formed including the inductance, a second switching element having one end thereof connected to the other end of the inductance, a second switching switch for connecting the other end of the second switching element and one low-voltage-side node selected from the low-voltage-side nodes of the individual storage cells connected on the low-voltage side of the reference node of the battery pack, and the storage cells between the reference node and the selected low-voltage-side node;
wherein the high-voltage-side node to which the first switching switch is connected is switched sequentially and the low-voltage-side node to which the second switching switch is connected is switched sequentially;
wherein for each combination of first and second closed circuits that are determined respectively by the high-voltage-side node and the low-voltage-side node to which the first and second switching switches are connected, the first and second switching elements are turned ON/OFF alternatingly so that the ratio of the conductive time of the first switching element and the conductive time of the second switching element in a specific interval is the inverse of the ratio of the number of storage cells included in the first closed circuit and the number of storage cells included in the second closed circuit; and
wherein a cycle is repeated wherein the high-voltage-side node to which the first switching switch is connected and the low-voltage-side node to which the second switching switch is connected are switched sequentially.

6. A remaining capacity equalizing device for equalizing the remaining capacities of a plurality of storage cells that are connected in series to form a battery pack, comprising:
a first switching element having one end thereof connected to the highest-voltage terminal of the battery pack;
a second switching element having one end thereof connected to the lowest-voltage terminal of the battery pack;
an inductance having one end thereof connected to the other ends of the first and second switching elements;
a switching switch group able to connect the other end of the inductance and each node in the plurality of storage cells; and
a controlling portion for controlling the ON/OFF switching of the first and second switching elements and of the switching switch group; wherein:
the controlling portion:
selects and places sequentially into a conductive state, one at a time, a switching switch from the switching switch group to form a first closed circuit including the switching switch, the storage cells that are connected on the high-voltage side of the node to which the switching switch is connected, the first switching element, and the inductance, and to form a second closed circuit including the selected switching switch, the storage cells that are connected on the low-voltage side of the node to which the switching switch is connected, the second switching element, and the inductance;
turns the first and second switching elements ON/OFF alternatingly so that, for each combination of first and second closed circuits that are determined by the selection of the selecting node, in the specified interval, the ratio of the conductive time of the first switching element and the conductive time of the second switching element is the inverse of the ratio of the number of storage cells included in the first closed circuit and the number of storage cells included in the second closed circuit; and
a cycle is repeated wherein the switching switches selected from the switching switch group are selected sequentially.

7. A remaining capacity equalizing device as set forth in claim 6, wherein:
the controlling portion shortens, during the initial period of the specified interval, the respective conductive times for the first and second switching elements in one ON/OFF period of the first and second switching elements, while maintaining the ratio of the conductive time of the first switching element and the conductive time of the second switching element, in each combination of the first and second closed circuits, and then lengthens these conductive times as time elapses.

8. A remaining capacity equalizing device as set forth in claim 6 or claim 7, wherein:
the controlling portion comprises:
a driving signal outputting portion for outputting a driving signal for turning ON/OFF the first and second switching elements;
a voltage measuring portion for measuring a terminal voltage at the other end of the inductance;
a threshold value setting portion for setting a first threshold voltage provided with a specific offset on the high-voltage side, relative to an intermediate voltage, and a second threshold voltage provided with a specific offset on the low-voltage side, relative to the intermediate voltage, with the terminal voltage when both the first and second switching elements are simultaneously in the non-conductive state as the intermediate voltage; and
an ON time detecting portion for comparing the measured terminal voltage and the first threshold voltage to calculate a first ON time wherein the first switching element is in a conductive state, and for comparing the measured terminal voltage and the second threshold voltage to calculate a second ON time wherein the second switching element is in a conductive state;

wherein:

the driving signal outputting portion performs feedback control of the driving signal so that the ratio of the first ON time and the second ON time will be the inverse of the ratio of the number of storage cells included in the first closed circuit and the number of storage cells included in the second closed circuit.

9. A remaining capacity equalizing device set for equalizing the remaining capacities of a plurality of storage cells that are connected in series to structure a set of battery packs wherein a plurality of battery packs is connected in series, wherein:

a remaining capacity equalizing device as set forth in claim 6 is provided for each individual battery pack; and adjacent battery packs share at least one storage cell.

10. A remaining capacity equalizing method for equalizing the remaining capacities of a plurality of storage cells that are connected in series to form a battery pack, wherein:

a first closed circuit is formed including a first switching element having one end thereof connected to the highest-voltage terminal of the battery pack, an inductance having one end thereof connected to the other end of the first switching element, a switching switch for connecting the other end of the inductance and one selected node selected from the nodes of the battery pack, and the storage cells that are connected on the high-voltage side of the selected node;

a second closed circuit is formed including a second switching element having one end thereof connected to the lowest-voltage terminal of the battery pack, an inductance having one end thereof connected to the other end of the second switching element, a switching switch group, and the storage cells that are connected on the low-voltage side of the selected node;

the selected nodes that are connected to the switching switches are switched sequentially;

for each combination of first and second closed circuits that are determined by the selection of the selected node, the first and second switching elements are turned ON/OFF alternatingly so that the ratio of the conductive time of the first switching element and the conductive time of the second switching element in a specific interval is the inverse of the ratio of the number of storage cells included in the first closed circuit and the number of storage cells included in the second closed circuit; and a cycle is repeated wherein the selected node to which the switching switch is connected is switched sequentially.

\* \* \* \* \*